United States Patent [19]
Fraley et al.

[11] Patent Number: 5,706,505
[45] Date of Patent: Jan. 6, 1998

[54] METHOD AND SYSTEM FOR BINDING DATA IN A COMPUTER SYSTEM

[75] Inventors: Christopher Lee Fraley, Woodinville; Jerry J. Dunietz, Seattle; Andrew Layman; Christopher A. Zimmerman, both of Bellevue; Gunnar Mein, Issaquah, all of Wash.

[73] Assignee: Microsoft Corporation, Redmond, Wash.

[21] Appl. No.: 292,564

[22] Filed: Aug. 19, 1994

[51] Int. Cl.⁶ .............................. G06F 17/30; G06F 15/00
[52] U.S. Cl. .................... 395/614; 395/601; 395/611; 395/784; 395/785; 345/1
[58] Field of Search ...................... 395/600, 145, 395/163, 148, 700

[56] References Cited

U.S. PATENT DOCUMENTS

| | | | |
|---|---|---|---|
| 5,255,356 | 10/1993 | Michelman et al. | 395/148 |
| 5,388,196 | 2/1995 | Pajak et al. | 395/153 |
| 5,396,587 | 3/1995 | Reed et al. | 395/145 |
| 5,452,459 | 9/1995 | Drury et al. | 395/700 |
| 5,485,617 | 1/1996 | Stutz et al. | 395/700 |

*Primary Examiner*—Thomas G. Black
*Assistant Examiner*—Cheryl Lewis
*Attorney, Agent, or Firm*—Seed and Berry LLP

[57] ABSTRACT

An improved method and system for binding data is provided. In a preferred embodiment of the present invention, bound controls transfer data to cursors through a binding manager. The binding manager is also responsible for transferring data from a cursor to a bound control. In addition, a preferred embodiment of the present invention provides for a notification mechanism as part of the cursor. The notification mechanism of the cursor of the preferred embodiment provides synchronization amongst all binding managers utilizing the cursor. The notification mechanism of the preferred embodiment provides synchronization amongst all binding managers by invoking event handlers registered by the binding managers. The event handlers are invoked by the cursor both before and after an operation is performed by the cursor.

32 Claims, 19 Drawing Sheets

METHOD AND SYSTEM FOR BINDING DATA IN A COMPUTER SYSTEM

FIELD OF THE INVENTION

The present invention relates generally to data processing systems and, more particularly, to the binding of data in a data processing system.

BACKGROUND OF THE INVENTION

In the computer field, the term "binding data" refers to creating a logical link between a mechanism that utilizes data and a data source that contains the data. Such a mechanism includes a display mechanism that displays data to a user. Typically, the display mechanism has a local copy of the data and displays the data on a computer display. Because the display mechanism and the data source are logically linked, the copy of the data in the display mechanism is updated when the data in the data source is modified. Conversely, the data in the data source is updated when the copy of the data in the display mechanism is modified.

The display mechanism is, using object-oriented parlance, an object that is referred to as a "bound control." A bound control has properties associated with it, that include data currently being displayed, background color, title, or other features of the bound control usually visible to the user. Each property may be linked to a different data source. For example, the title of a bound control may be linked to one data source and the data displayed within the bound control may be linked to another data source. A bound control is responsible for displaying properties to a user so that the user may view or modify the properties of the bound control.

Data sources usually consist of a data store and a cursor. The data store contains the data and normally resides on a secondary storage device. Typically, the data stored within the data store is tabular in nature, which means that the data is organized into rows and columns. A row in the data store is usually referred to as a record, and each column within the record is usually referred to as a field. A database or a spreadsheet are examples of a data store that contain data that is tabular in nature.

The cursor is an object that maintains a subset of the data store which reflects the result of a query ("result set") performed on the data store. In addition, the cursor contains an indicator, which refers to a logical position within the result set. This indicator is known as the "currency." Since the result set is also a table, the currency refers to a record within the result set. Although a cursor has been described as maintaining a subset of the data store, the cursor could refer to the entire data store, in which case the result set is equivalent to the data store.

The cursor provides a number of operations (methods) that can be performed to maintain the result set. Such operations include: retrieving a record from the result set at the location of the currency, modifying a record at the location of the currency, moving the currency to refer to the previous or next record, and moving the currency to refer to the first or last record in the result set.

The source control is an object which interfaces with the cursor to manipulate the currency. The source control typically displays various options for manipulating the currency. When the user selects an option, the source control manipulates the currency accordingly.

FIG. 1A depicts a user-visible representation of the components utilized by a conventional system for binding data. Conventional systems for binding data contain a computer display 102 displaying a window 104. The window 104 displays the user-visible representation of two bound controls 106, 107 and a user-visible representation of a source control 108. FIG. 1B depicts the components utilized by a conventional system for binding data. Conventional systems for binding data contain a memory 140 and a secondary storage device 150 that contains a result set 110. The memory 140 contains a cursor 112, a source control 148 and two bound controls 146, 147. The source control 148 displays the user-visible representation of the source control 108, and the two bound controls 146, 147 display the user-visible representation of the two bound controls 106, 107, respectively. The bound controls 146, 147 are responsible for presenting data to a user from the result set 110. The source control 148 displays a user-visible representation 108 that allows a user to manipulate the cursor 112. The user-visible representation of the source control 108 provides four buttons 114, 116, 118, and 120. The first button 114 of the user-visible representation of the source control 108 is used to select the last record in the result set 110. The second button 116 is used to select the next record in the result set 110. The third button 118 is used to select the previous record in the result set 110. The fourth button 120 is used to select the first record in the result set 110. Both the bound controls 146, 147 and the source control 148 are objects. The concept of objects will be discussed in more detail below. The cursor 112 is responsible for performing operations on the result set 110 and maintaining a currency 122 to the result set 110. The result set 110 contains tabular data consisting of two columns 124, 126 and six records 128, 130, 132, 134, 136 and 138. The currency as shown points to record 132.

Each bound control 146, 147 displays one field within a record of the result set 110. A field within a record refers to a column of the record. In the example of FIG. 1B, bound control 147 is logically linked to column 124 and bound control 146 is logically linked to column 126. Therefore, if a user were to select the button 116 on the user-visible representation of the source control 108 to move to the next record in the result set 110, the currency 122 would move from record 132 to refer to record 134 and the bound controls 147, 146 would display the data in record 134 of the result set 110. That is, the user-visible representation of the bound control 107 would contain "data 10" and the user-visible representation of the bound control 106 would contain "data 4."

Using conventional systems, the bound controls 146, 147 communicate directly to the source control 148. Thus, the bound controls 146, 147 and the source control 148 contain communication code in order to transfer data back and forth. This communication code is implemented for each source control and bound control. In addition, the communication code implemented in the source controls and bound controls can be complex and, therefore, poses a problem as can be seen in the following example. For instance, if a user selects the button 116 on the user-visible representation of the source control 108 to move to the next record of the result set 110, before moving the currency 122 to refer to the next record 134, the source control 148 updates the record 132 that the currency currently refers to (the "current record") when the user has modified the data contained within the bound controls 146, 147. Thus, the source control 148 communicates to each bound control 146, 147 and asks each bound control if its data has been modified (i.e., "dirty"). If either of the bound controls 146, 147 contains dirty data, the source control 148 retrieves the dirty data and updates the current record 132 before moving the currency 122 to refer to the next record 134. Thus, it can be appreciated that the communication code in bound controls and source controls can become complex, which makes the implementation of bound controls and source controls complicated.

Another problem encountered by conventional systems for binding data is the problem of synchronization. There are two types of synchronization. The first type of synchronization is the synchronization of the bound controls that reside on the same window and refer to the same record. That is, each bound control that is logically linked to the same source control should refer to the same record in the result set. The second type of synchronization is the synchronization of bound controls on separate windows which refer to the same record in the result set. That is, each bound control on separate windows logically linked to the same record should be updated when the record is updated or the currency in the cursor moves. Conventional systems handle the first type of synchronization by implementing code within the source control so that the source control knows of all bound controls on the window and that each time the currency moves, the source control updates the bound controls. This additional code within the source control further complicates the implementation of a source control.

The second type of synchronization can be performed by conventional systems if the bound controls on one of the windows knows of the bound controls on the other windows. For example, as part of the functionality of a bound control on a first window, a user may be able to double-click on the data contained within the bound control to spawn a new (a second) window with bound controls displaying other fields within the current record. The bound control on the first window must know of the newly spawned bound controls on the second window so that when the currency moves, the newly spawned bound controls can receive the data in the new record referred to by the currency. Thus, the bound controls contain code to keep track of all newly-spawned bound controls on newly-spawned windows. Otherwise, the newly-spawned bound controls would not be logically linked to the same record as the bound controls on the first window and would become unsynchronized when the currency is moved. This, again, further complicates the code necessary for implementing bound controls. Since the bound controls on one window must know of all bound controls on other windows logically linked to the same cursor, using conventional systems, there is no facility for bound controls on separate windows being logically linked to the same cursor when the bound controls do not know of each other.

Since the present invention is described below using some object-oriented techniques, an overview of well-known object-oriented programming techniques is provided. Two common characteristics of object-oriented programming languages are support for data encapsulation and data type inheritance. Data encapsulation refers to the binding of functions and data. Inheritance refers to the ability to declare a data type in terms of other data types. In the C++ programming language, data encapsulation and inheritance are supported through the use of classes. A class is a user-defined type. A class declaration describes the data members and function members of the class. A function member is also referred to as a method of a class. The data members and function members of a class are bound together in that the function members operate on a particular instance of the data members of the class. An instance of a class is also called an object of the class. Thus, a class provides a definition for a group of objects with similar properties and common behavior.

To allocate storage for an object of a particular type (class), an object is instantiated. Once instantiated, data can be assigned to the data members of the particular object. Also, once instantiated, the function members of the particular object can be invoked to access and manipulate the data members. Thus, in this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual means that the function can be overridden by a function of the same name and type in a derived class. If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before that function member may be invoked. A class which contains at least one pure virtual function member is an abstract class.

FIG. 2 is a block diagram illustrating typical data structures used to represent an object. An object is composed of instance data (data members) and function members, which implement the behavior of the object. The data structures used to represent an object comprise instance data structure 201, virtual function table 202, and the function members 203, 204, 205. The instance data structure 201 contains a pointer to the virtual function table 202 and contains data members. The virtual function table 202 contains an entry for each virtual function member defined for the object. Each entry contains a reference to the code that implements the corresponding function member. The layout of this sample object conforms to models defined in U.S. Pat. No. 5,297,284, entitled "A Method for Implementing Virtual Functions and Virtual Bases in a Compiler for an Object Oriented Programming Language," which is hereby incorporated by reference. In the following, an object will be described as an instance of a class as defined by the C++ programming language. One skilled in the art would appreciate that other object models can be defined using other programming languages.

An advantage of using object-oriented techniques is that these techniques can be used to facilitate the sharing of objects. For example, a program implementing the function members of an instantiated object (a "server program") can share the object with another program (a "client program"). To allow an object of an arbitrary class to be shared with a client program, interfaces are defined through which an object can be accessed without the need for the client program to have access to the class definitions at compile time. An interface is a named set of logically related function members ("methods") and data members ("properties"). In C++, an interface is an abstract class with no data members and whose virtual functions are all pure. Thus, an interface provides a published protocol for two programs to communicate. Interfaces are typically used for derivation: a program defines (implements) classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

When a client program desires to share an object, the client program needs access to the code that implements the interfaces for the object (the derived class code). To access the derived class code (also referred to as class code), each class implementation is given a unique class identifier (a "CLSID"). For example, code implementing a spreadsheet object developed by Microsoft Corporation may have a class identifier of "MSSpreadsheet," while code implementing a spreadsheet object developed by another corporation may have a class identifier of "LTSSpreadsheet." A persistent registry in each computer system is maintained that maps each CLSID to the code that implements the class. Typically, when a spreadsheet program is installed on a computer system, the persistent registry is updated to reflect the availability of that class of spreadsheet objects. So long as a spreadsheet developer implements each function member defined by the interfaces to be supported by spreadsheet objects and so long as the persistent registry is maintained, the client program can access the function members of shared spreadsheet objects without regard to which server program has implemented them or how they have been implemented.

Since an object may support some interfaces and not others, a client program would need to determine at runtime whether a particular object supports a particular interface. To enable this determination, every object supports the interface IUnknown, which contains a function member, QueryInterface, that indicates which interfaces are implemented for the object. The method QueryInterface is defined as follows:

virtual HRESULT QueryInterface (REFIID iid, void**ppv)=0;

The method QueryInterface is passed an interface identifier in parameter iid (of type REFIID) and returns in parameter ppv a pointer to the implementation of the identified interface of the object for which the method is invoked. If the object does not support the interface, then the method returns a false. The type HRESULT indicates a predefined status.

FIG. 3 is a symbolic representation of an object. In the following description, an object data structure is represented by the shape 301 labeled with the interfaces through which the object may be accessed.

SUMMARY OF THE INVENTION

The present invention provides an improved synchronization mechanism and an improved communication mechanism for binding data. The improved synchronization mechanism sends notifications from a cursor to consumer components listening for the notifications. These notifications request permission for the cursor to perform an operation, provide an opportunity for the consumer components to synchronize with the cursor before the operation is performed, and provide an opportunity for the consumer components to synchronize with the cursor after the operation has been performed.

The improved communication mechanism provides a centralized mechanism known as a binding manager that facilitates communication between the cursor and bound controls. The binding manager transfers data between the cursor and the bound controls in order to keep the cursor and the bound controls synchronized. By utilizing a binding manager, the implementation of bound controls and cursors is facilitated.

In accordance with a first aspect of the present invention, a computer system is provided for binding data stored in a data store to data displayed to a user in a bound control. The computer system has a data source, a bound control, and a binding manager. The data source maintains data (stored data), sends notifications to the binding manager when the stored data is accessed; the bound control displays the stored data to a user and allows a user to modify the displayed data; and the binding manager listens for the notifications of the data source. In response to receiving a first type of notification, the binding manager transfers the displayed data from the bound control to the data source. In response to receiving a second type of notification, the binding manager transfers stored data from the data source to the bound control.

In accordance with the second aspect of the present invention, a computer system is provided for synchronizing data stored in a data source with data of consumer components. The computer system comprises a plurality of consumer components and a data source. The consumer components present data to a user for display and modification and send modification requests to the data source. The data source stores the data, receives requests to manipulate the data source, and sends notifications to the consumer components. A first of the notifications indicates that a request has been received by the data source to manipulate the data source. A second of the notifications notifies the consumer components before the requested manipulation is performed. A third of the notifications indicates that all modified presented data of the consumer components has been transferred to the data source. A fourth of the notifications indicates that the requested manipulation has been performed. The fifth of the notifications indicates that new data has been transferred from the data source to all of the consumer components.

DETAILED DESCRIPTION OF THE INVENTION

Figure 1A:
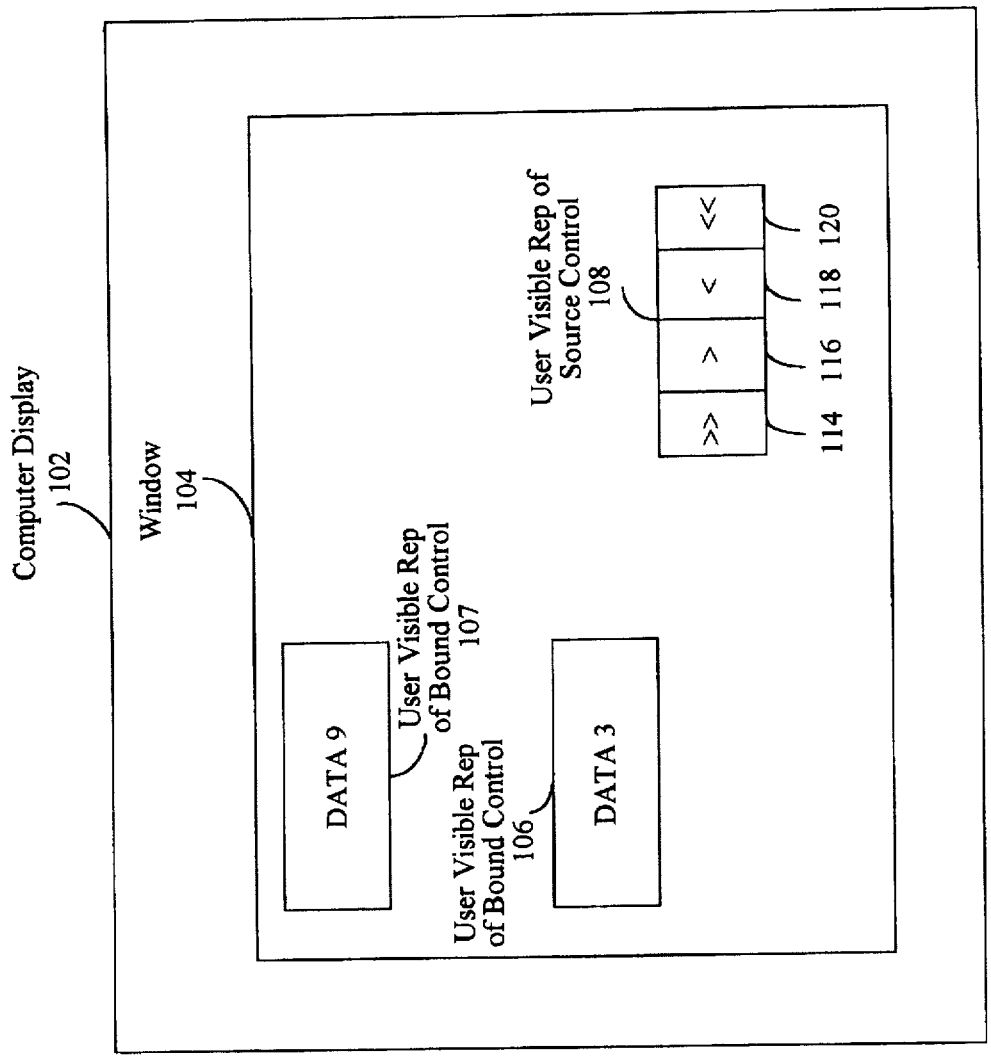
FIG. 1A depicts the user-visible representation of the components utilized by a conventional system for binding data.
Figure 1B:
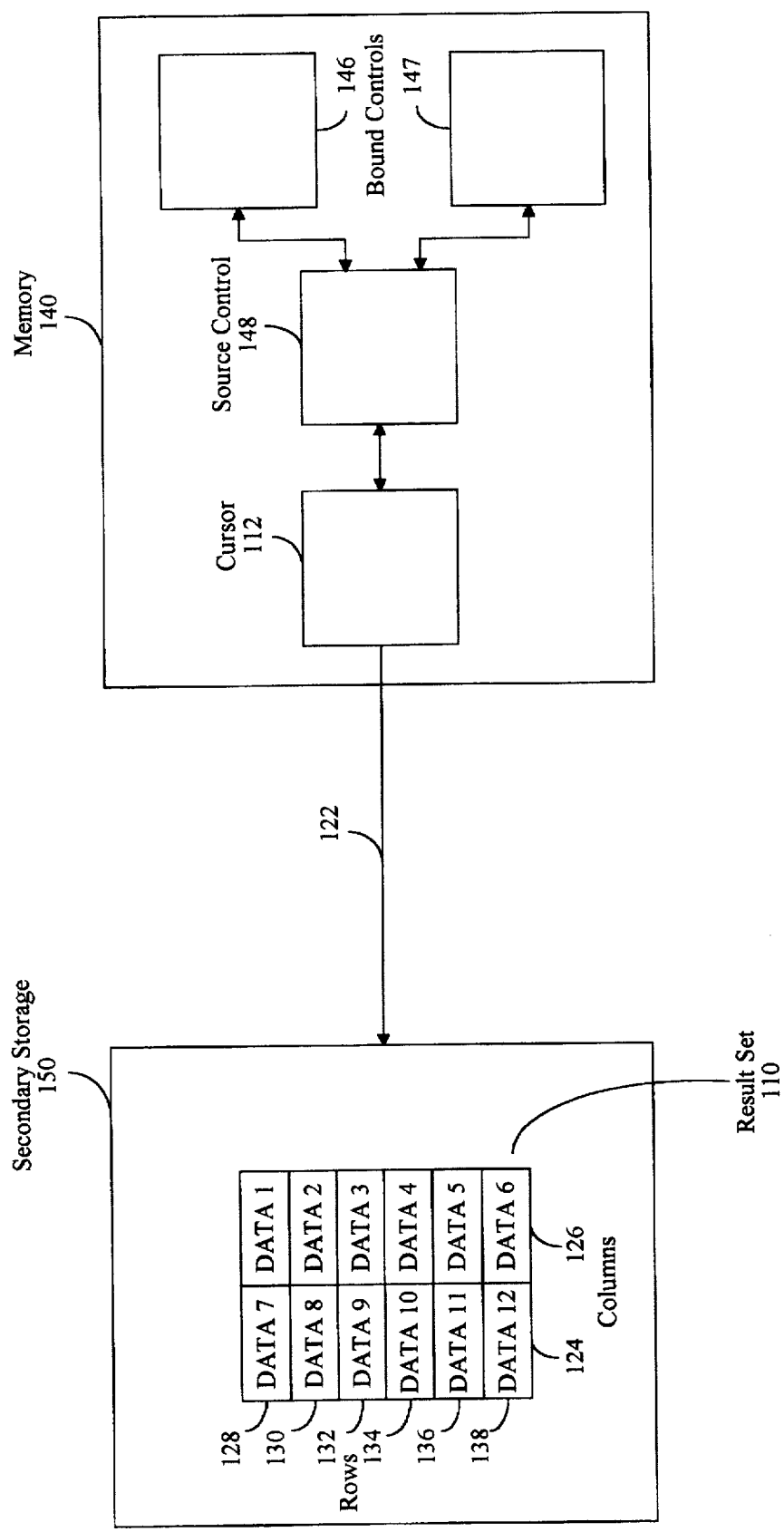
FIG. 1B depicts the components utilized by a conventional system for binding data.
Figure 2:
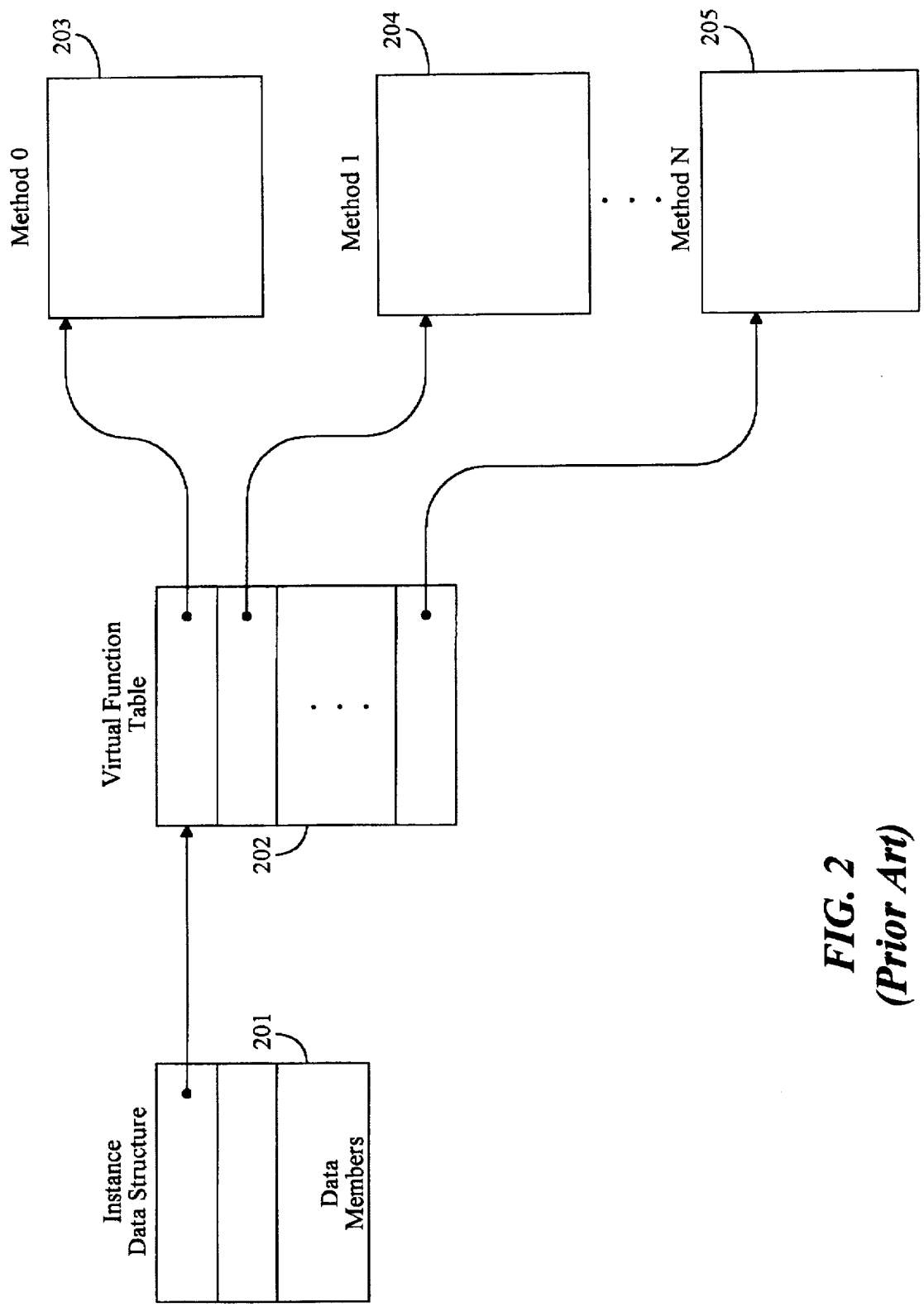
FIG. 2 is a block diagram illustrating typical data structures used to represent an object.
Figure 3:
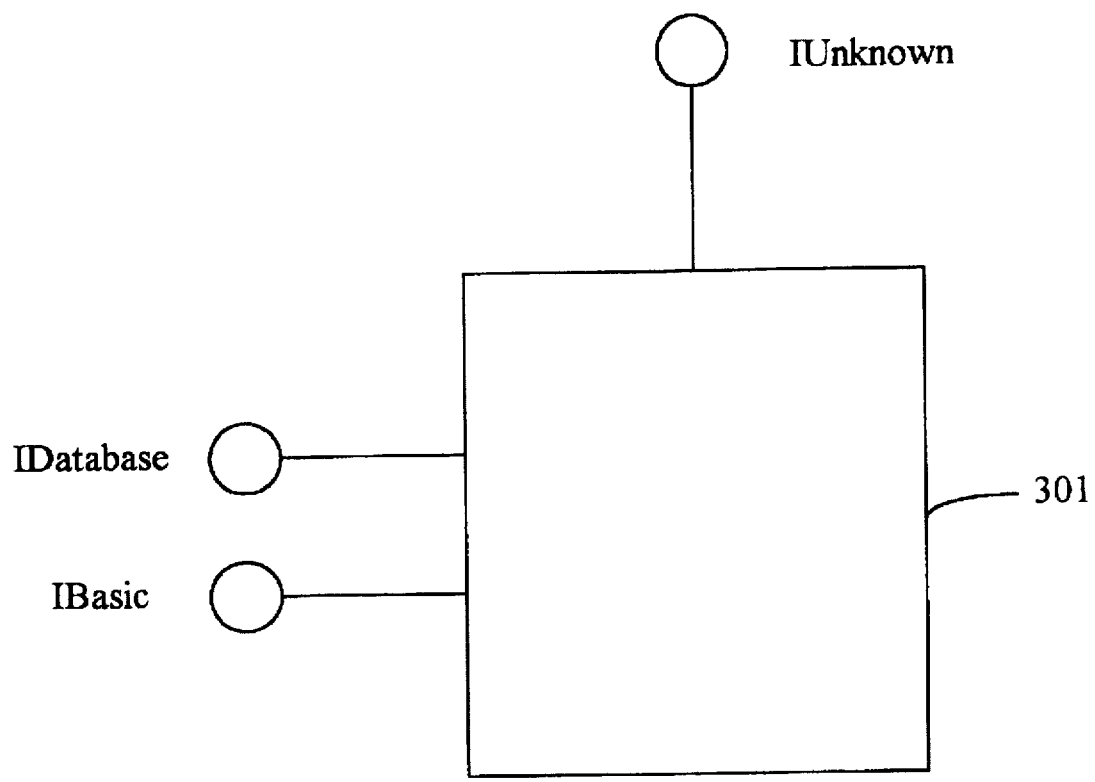
FIG. 3 is a symbolic representation of an object.

A preferred embodiment of the present invention provides for an improved method and system for binding data. The present invention provides an improved synchronization mechanism as well as an improved communication mechanism for communicating between bound controls and cursors. The present invention provides an improved synchronization mechanism by providing notifications from a cursor to "binding managers" that are listening for the notifications. A binding manager is a centralized mechanism for maintaining the logical link between bound controls and cursors. These notifications generated by the cursor request permission for an operation to be performed from the binding manager, provide an opportunity for the binding managers to synchronize with the cursor before an operation is performed, and provide for an opportunity for the binding managers to synchronize with the cursor after an operation has been performed. Thus, any binding manager, regardless of which window the binding manager is associated, receives notifications for all operations performed by the cursor. Therefore, the improved synchronization mechanism of the present invention provides synchronization between binding managers (and, hence, bound controls) and the cursor regardless of where the binding managers or bound controls reside. The binding managers utilize the improved notification mechanism by registering to receive notifications from the cursor. A binding manager registers to receive notifications from the cursor by registering with the cursor an interface containing event handlers (methods). The event handlers on the registered interface process all of the notifications generated by the cursor. By generating notifications and invoking the event handlers of the registered interfaces, it can be ensured that all binding managers are synchronized. Therefore, the present invention provides an improved synchronization mechanism.

The present invention provides an improved communication mechanism by merging the cursor interface functionality performed by conventional source controls into the cursor so that a source control is no longer needed when binding data. In addition, the present invention provides an improved communication mechanism by transferring data between bound controls and cursors through a binding manager. The binding manager is responsible for maintaining logical links between the bound controls and the cursors. By maintaining the logical links, the binding manager detects when data in a bound control becomes dirty and updates the cursor accordingly. In addition, the binding manager detects when an operation has been performed on the cursor and updates the data in the bound controls linked to the cursor accordingly. Therefore, by utilizing the binding manager of the present invention for communicating between bound controls and cursors, the implementation of bound controls and cursors is facilitated. This facilitation is seen through a reduction in the amount of communication code necessary in both bound controls and cursors.

The preferred embodiment of the present invention is designed to operate in an object-oriented environment, such as an environment that supports the Microsoft OLE 2.0 ("OLE") protocol established by Microsoft Corporation of Redmond, Wash. Although the preferred embodiment is described as being utilized within the OLE environment, one skilled in the art will appreciate that the present invention can be used in other environments.

Figure 4:
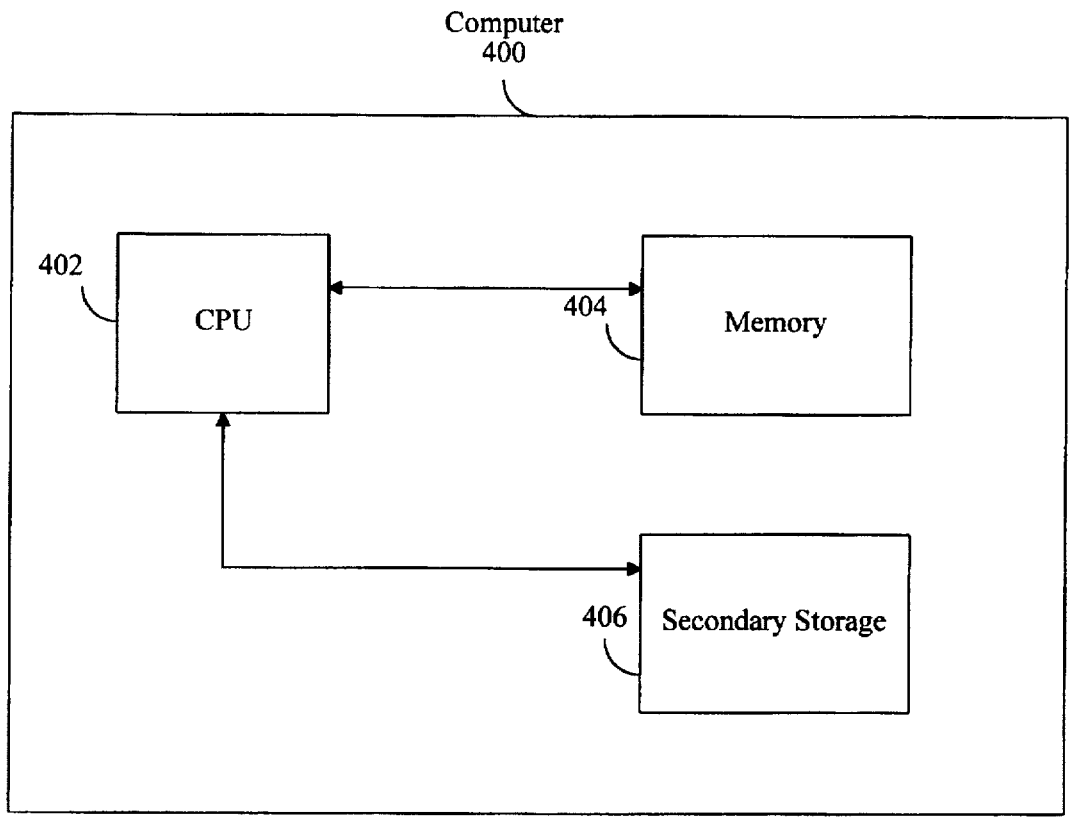
FIG. 4 is a diagram of a computer system suitable for practicing a preferred embodiment of the present invention.

FIG. 4 depicts a computer system suitable for practicing the preferred embodiment of the present invention. The computer 400 contains a central processing unit (CPU) 402, a memory 404, and a secondary storage device 406. The CPU 402 is responsible for accessing data and computer programs on the secondary storage device 406. In addition, the CPU 402 is responsible for transferring computer programs into the memory 404 and executing the computer programs once resident in the memory. One skilled in the art will appreciate that a computer suitable for practicing the preferred embodiment of the present invention can contain additional or different components.

Improved Synchronization Mechanism

Figure 5:
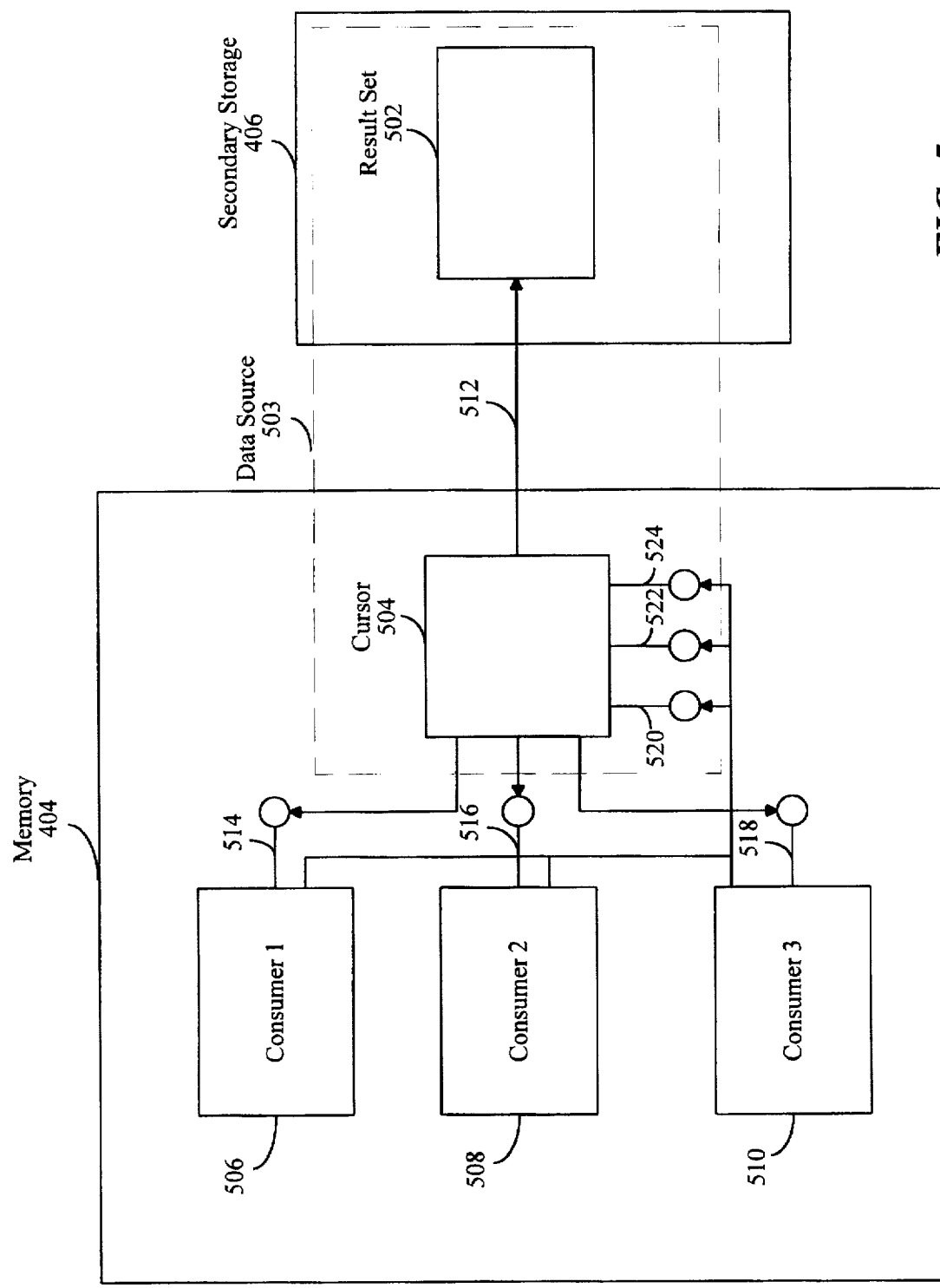
FIG. 5 is a high level diagram of the preferred embodiment of the present invention within the memory and the secondary storage device of the computer system of FIG. 4.

FIG. 5 depicts a high level view of the preferred embodiment of the present invention within the memory 404 of the computer system 400 of FIG. 4. The memory 404 contains a cursor 504 and three consumer components 506, 508, and 510. The cursor 504 exposes three interfaces: ICursor 520, ICursorUpdateARow 522, and ICursorMove 524. Each consumer component 506, 508, 510 implements an INotifyEvent interface 514, 516, 518. The secondary storage device 406 contains a result set 502. One skilled in the art would appreciate that the result set could alternatively be stored in memory 404. Both the cursor 504 and the result set 502 are part of a data source 503. The cursor 504 is an object that is implemented as a separate process. Alternatively, the cursor 504 may be implemented as a module within the address space of one of the consumer components 506, 508, 510. The cursor 504 is responsible for performing operations upon the result set 502, as well as providing a currency 512 into the result set. In addition, the cursor 504 of the preferred embodiment generates notifications ("events") upon receiving a request to perform an operation on the result set 502 or the currency 512 of the cursor. The cursor 504 receives requests to perform an operation when a consumer component 506, 508, 510 invokes a method on an exposed interface 520, 522, 524. An operation performed by the cursor includes changing the currency 512, as well as retrieving or modifying the current record. The consumer components 506, 508, 510 can be any of a number of entities including, but not limited to, bound controls, windows, computer programs, objects, or other software or hardware entities. The consumer components 506, 508, 510 register interfaces 514, 516, 518 containing event handlers with the cursor 504, which then allows the consumer components to receive events. Such event handlers are considered to be "registered." When an event is generated by the cursor 504, the appropriate event handlers are executed by the cursor 504 as defined by the consumer components 506, 508, 510. As described below in more detail, by utilizing the notification mechanism provided by the present invention, multiple consumer components 506, 508, 510 can be synchronized and utilize a common cursor regardless of the knowledge that each consumer component has for each other. Based on the above description, the consumer components and the cursor form a client-server relationship with the consumer components acting as the clients and the cursor acting as the server.

The cursor 504 of the preferred embodiment provides database functionality as well as the notification mechanism. The database functionality performed by the cursor 504 is accessible through a number of interfaces 520, 522, 524. The ICursor interface 520 provides methods which allow for retrieving records from the result set 502 and moving the currency 512. One method on the ICursor interface 520, "GetRows," provides for retrieving multiple records starting with the current record from the result set 502 and advancing the currency 512 to refer to the last record retrieved. The ICursorUpdateARow interface 522 contains methods for writing data to the current record. One method, "BeginUpdate," allocates an edit buffer that stores all edits to the current record before committing the edited record to the result set 502 which overwrites the current record. A second method on the ICursorUpdateARow interface 522, "SetColumn," provides for setting a field within the edit buffer. A third method, "Update," commits the record in the edit buffer to the result set 502, which overwrites the current record. The ICursorMove interface 524 contains methods that manipulate the currency 512. One method on the ICursorMove interface 524, "Move," moves the currency either forward or backward to refer to a different record according to a logical offset from the current record.

The notification mechanism utilized by the cursor 504 of the preferred embodiment is implemented as a connection point. Using connection points, each consumer component 506, 508 and 510 registers an interface 514, 516, 518 with the cursor so that upon the occurrence of an event generated by the cursor 504, the cursor executes an appropriate method (i.e., event handler) within the registered interface. The registration of the interface with the cursor 504 is performed as described in U.S. patent application Ser. No. 08/166,976, entitled "Method and System for Dynamically Generating Objection Connections," which is hereby incorporated by reference. The interface that is registered by each consumer component with the cursor 504 of the preferred embodiment is the INotifyEvents interface.

The INotifyEvents interface contains seven event handlers: OKToDo, Canceled, SynchBefore, AboutToDo, FailedToDo, SynchAfter and DidEvent. The cursor invokes the OKToDo event handler after a request to perform an operation has been received by the cursor. That is, the cursor invokes the OKToDo event handler when a method of the cursor is invoked which affects the currency or the result set. By invoking the OKToDo event handler, the cursor requests permission to perform the requested operation. In this regard, the OKToDo event handlers may return a return code which denies permission to the cursor to perform the requested operation. If this occurs, the cursor invokes the Canceled event handlers to notify all consumer components registered to receive events that the requested operation has been canceled. If all of the OKToDo event handlers grant permission to the cursor to perform the requested operation, the cursor invokes the SynchBefore event handlers. By invoking the SynchBefore event handlers, the consumer components are given an opportunity to synchronize their data with the cursor. After all of the SynchBefore event handlers have completed processing, the cursor invokes the AboutToDo event handlers to indicate to the consumer components that all of the SynchBefore event handlers have completed processing and to indicate to the consumer components that the requested operation is about to be performed.

After the requested operation has been performed, if a failure occurred during the processing of the requested operation, the cursor invokes the FailedToDo event handlers. If the requested operation completed processing successfully, the cursor invokes the SynchAfter event handlers. By invoking the SynchAfter event handlers, the cursor gives the consumer components an opportunity to synchronize their data with the cursor. After all of the SynchAfter event handlers have completed processing, the cursor invokes the DidEvent event handlers to indicate to the consumer components that all of the SynchAfter event handlers have completed processing.

The FailedToDo event handler is also invoked when an error occurs in an event handler. Thus, if an error occurs during the processing of the OKToDo event handler, the SynchBefore event handler, or the AboutToDo event handler, the cursor invokes the FailedToDo event handler.

In utilizing the INotifyEvents interface, various enumerators are used as described in Code Table 1.

| Code Table 1 |
|---|
| typedef enum tagEVENTWHATS { <br>     EVENT_CURRENCY_CHANGED = 1, <br>     EVENT_DATA_IN_CURRENCY_CHANGED = 2, <br>     EVENT_DATA_IN_NONCURRENCY_CHANGED = 4, <br>     EVENT_SET_OF_COLUMNS_CHANGED = 8, <br>     EVENT_ORDER_OF_COLUMNS_CHANGED = 16, <br>     EVENT_SET_OF_ROWS_CHANGED = 32, <br>     EVENT_ORDER_OF_ROWS_CHANGED = 64, <br>     EVENT_METADATA_CHANGED = 128 <br> } EVENTWHATS; <br> typedef enum tagREASON { <br>     REASON_DELETED = 1, <br>     REASON_INSERTED = 2, <br>     REASON_MODIFIED = 3, <br>     REASON_REMOVEDFROMCURSOR = 4, <br>     REASON_MOVEDINCURSOR = 5, <br>     REASON_MOVE = 6, <br>     REASON_FIND = 7, <br>     REASON_NEWINDEX = 8, <br>     REASON_SORTCHANGED = 13, <br>     REASON_FILTERCHANGED = 14 <br> } REASON; |

The enumerator EVENTWHATS indicates what change is occurring within the cursor. Thus, EVENTWHATS is an enumerator of values indicating an event that has been requested or has occurred. The values in the EVENTWHATS enumerator can be OR'd together to indicate more than one event occurring. The value EVENT_CURRENCY_CHANGED indicates that the currency within the cursor has moved and refers to a new record in the result set. The value EVENT_DATA_IN_CURRENCY_CHANGED indicates that the current record has been modified. The value EVENT_DATA_IN_NONCURRENCY_CHANGED indicates that data within the result set, not referred to by the currency, has been modified. That is, another record besides the current record has been modified. The value EVENT_SET_OF_COLUMN_CHANGED indicates that the number of columns within the result set has been modified. This can occur due to a subsequent query on a database (i.e., new generation of the result set). The value EVENT_SET_OF_ROWS_CHANGED indicates that the number of rows within the result set have been modified by either adding or removing rows. The value EVENT_ORDER_OF_ROWS_CHANGED indicates that the order of the rows within the result set has changed. The value EVENT_METADATA_CHANGED indicates that the schema of the result set has been modified. The "schema" of the result set refers to the specific definition of the rows and columns of the result set.

The enumerator REASON contains values indicating the specific operation which caused the changes to the cursor indicated by the EVENTWHATS enumerator. The value REASON_DELETED indicates that a row has been deleted. The value REASON_INSERTED indicates that a row has been inserted. The value REASON_MODIFIED indicates that a row has been modified. The value REASON_REMOVEDFROMCURSOR value indicates that a row has been removed from the cursor. The value REASON_MOVEDINCURSOR indicates that a row has changed position in the cursor. The value REASON_MOVE indicates that the currency within the cursor has been moved. The value REASON_FIND indicates a request has been received by the cursor to locate data within the result set and move the currency accordingly. The value REASON_NEWINDEX indicates that a new index will be utilized upon doing subsequent queries into the data store. The value REASON_SORTCHANGED indicates that the result set has been sorted according to selection criteria. Although both the EVENTWHATS structure and the REASON structure have been described with reference to specific values, one skilled in the art will appreciate that additional or different values can be used.

The INotifyEvents interface is described in Code Table 2.

---
Code Table 2
---

```
interface INotifyEvents : IUnknown{
    HRESULT OKToDo(EVENTWHATS dwEventWhat, ULONG
        cReasons, REASON[ ] rgReasons) = 0;
    HRESULT Canceled(EVENTWHATS dwEventWhat, ULONG
        cReasons, REASON[ ] rgReasons) = 0;
    HRESULT SyncBefore(EVENTWHATS dwEventWhat,
        ULONG cReasons, REASON[ ] rgReasons) = 0;
    HRESULT AboutToDo(EVENTWHATS dwEventWhat,
        ULONG cReasons, REASON[ ] rgReasons) = 0;
    HRESULT FailedToDo(EVENTWHATS dwEventWhat,
        ULONG cReasons, REASON[ ] rgReasons) = 0;
    HRESULT SynchAfter(EVENTWHATS dwEventWhat,
        ULONG cReasons, REASON[ ] rgReasons) = 0;
    HRESULT DidEvent(EVENTWHATS dwEventWhat, ULONG
        cReasons, REASON[ ] rgReasons) = 0;
};
```

The OKToDo event handler is invoked by the cursor when the cursor has been requested to perform an operation. By invoking the OKToDo event handler, consumer components are apprised of a requested operation so that the consumer components can cancel the operation from being performed. The parameter dwEventWhat of type EVENTWHATS indicates the changes to be made in the cursor. The parameter cReasons is the count of the number of operations in the rgReasons array. The parameter rgReasons is an array containing the operations to be performed. The operations in the rgReasons array correspond to the operations in the REASON enumerator. For example, if the requested operation is to move the currency, the rgReasons parameter would contain the REASON_MOVE value of the REASON enumerator. The dwEventWhat, the cReasons and the rgReasons parameters appear in the definitions of all of the event handlers and are utilized in the same fashion. Therefore, the description for these parameters are not provided for the event handlers described below. The OKToDo event handler returns S_OK, S_FALSE, or E_FAIL. When the OKToDo event handler remms S_OK, a consumer component is indicating to the cursor that the consumer component has given permission for the cursor to perform the operation. If, however, the OKToDo event handler returns S_FALSE, the consumer component is denying permission for the operation to proceed and the cursor then cancels the operation. A consumer component determines whether to deny permission for the operation to proceed based upon criteria such as the state of the consumer component and the type of the requested operation. For example, if a consumer component contains dirty data but is not capable of updating the current record due to the state that it is in (e.g., waiting for user input), the consumer component may deny permission for all requested operations involving currency changes. If the OKToDo event handler returns E_FAIL, an error has occurred during the processing of the OKToDo event handler.

The Canceled event handler is invoked by the cursor to notify all consumer components registered for notifications with the cursor that the requested operation will be canceled. That is, one of the consumer components returned S_FALSE in the OKToDo event handler. The return values of the Canceled event handler includes S_OK if the Canceled event handler returned successfully and E_FAIL if the Canceled event handler experienced an error during processing.

The SynchBefore event handler is invoked by the cursor before a requested operation is performed so that the consumer components registered for notifications can prepare for the operation to be performed. For example, if the operation to be performed were to move the currency to the next record, any consumer components containing dirty data would wish to write the dirty data to the current record before the currency moved to the next record. Otherwise, the dirty data in the consumer component would not be written to the result set and the data in the result set would not be updated. The return values for the SynchBefore event handler include S_OK, if the SynchBefore event handler returns successfully and E_FAIL, if a failure occurred during processing of the SynchBefore event handler. Therefore, the SynchBefore event handler is utilized by the consumer components registered for the notifications of the cursor to synchronize the copy of the data that the consumer components contain with the copy of the data in the cursor.

The AboutToDo event handler is invoked by the cursor to indicate that the SynchBefore event handler for each consumer component registered with the cursor has completed processing. This event handler, thus, indicates to consumer components that the requested operation is about to be performed. The AboutToDo event handler returns S_OK if processing was successful, and E_FAIL if processing was unsuccessful.

The FailedToDo event handler is invoked by the cursor when the requested operation is attempted and fails or if one of the other event handlers returns E_Fail. An example of a requested operation failing is if the requested operation conflicted with another operation already in progress. For example, if an attempt to move the currency (i.e., invocation of the Move method of the ICursorMove interface) is made while the SynchBefore event handlers are being invoked due to the allocation of an edit buffer (i.e., invocation of the BeginUpdate method of the ICursorUpdateARow interface), the attempt to move the currency would fail. The FailedToDo event handler returns S_OK if processing was successful, and E_FAIL if processing was unsuccessful.

The SynchAfter event handler is invoked by the cursor to provide the consumer components with the ability to synchronize after the requested operation has been performed. For example, if the requested operation were to move the currency to refer to the next record (e.g., by invoking the Move method of the ICursorMove interface), the consumer components can use this event to retrieve the data from the new record. The SynchAfter event handler returns S_OK if successful, and E_FAIL if processing of the SynchAfter event handler was unsuccessful.

The DidEvent event handler is invoked by the cursor to indicate that the SynchAfter event handler for each consumer component registered with the cursor has completed processing. The DidEvent event handler returns S_OK if successful, and E_FAIL if unsuccessful.

Figure 6A:
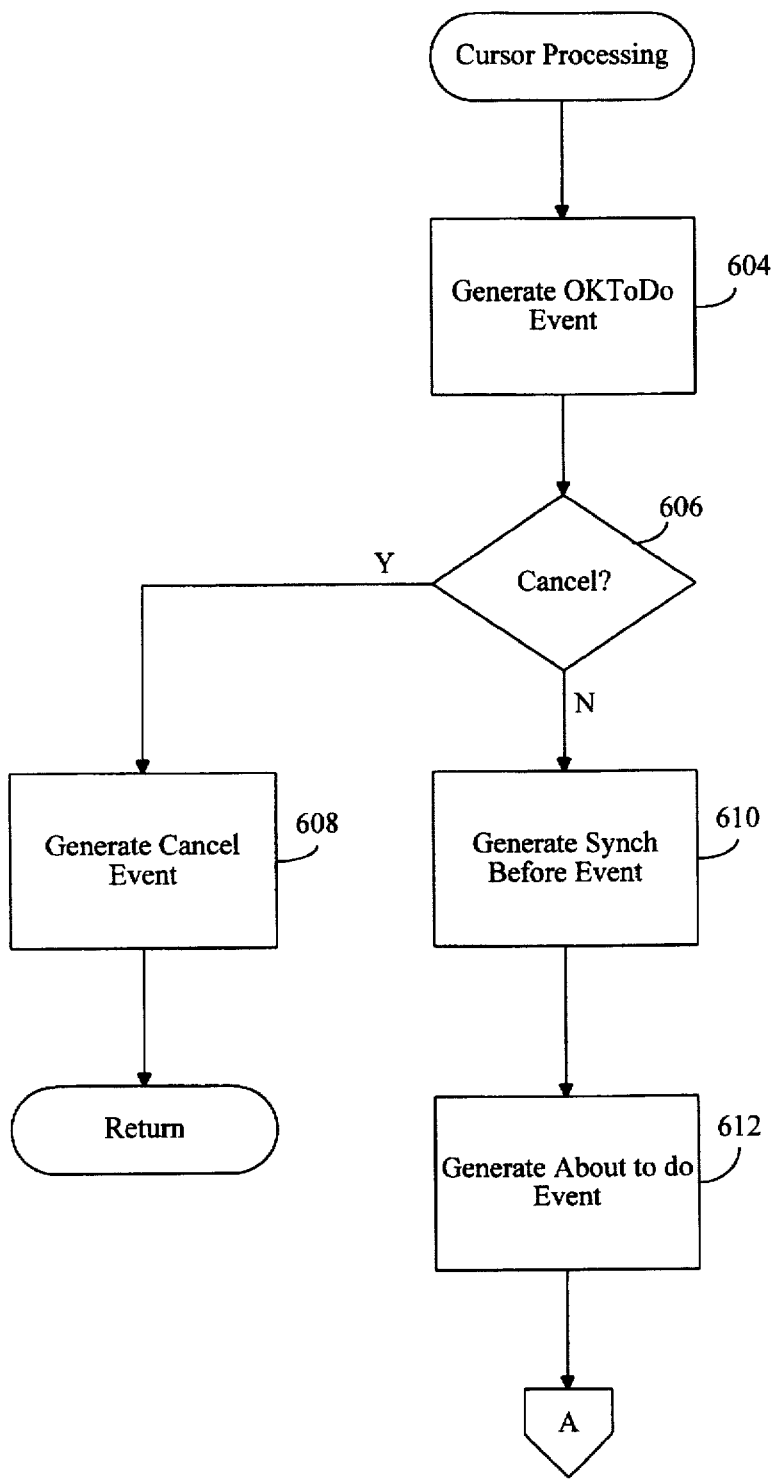
FIGS. 6A and 6B depict a flowchart of the steps performed by the cursor of the preferred embodiment for generating notifications.
Figure 6B:
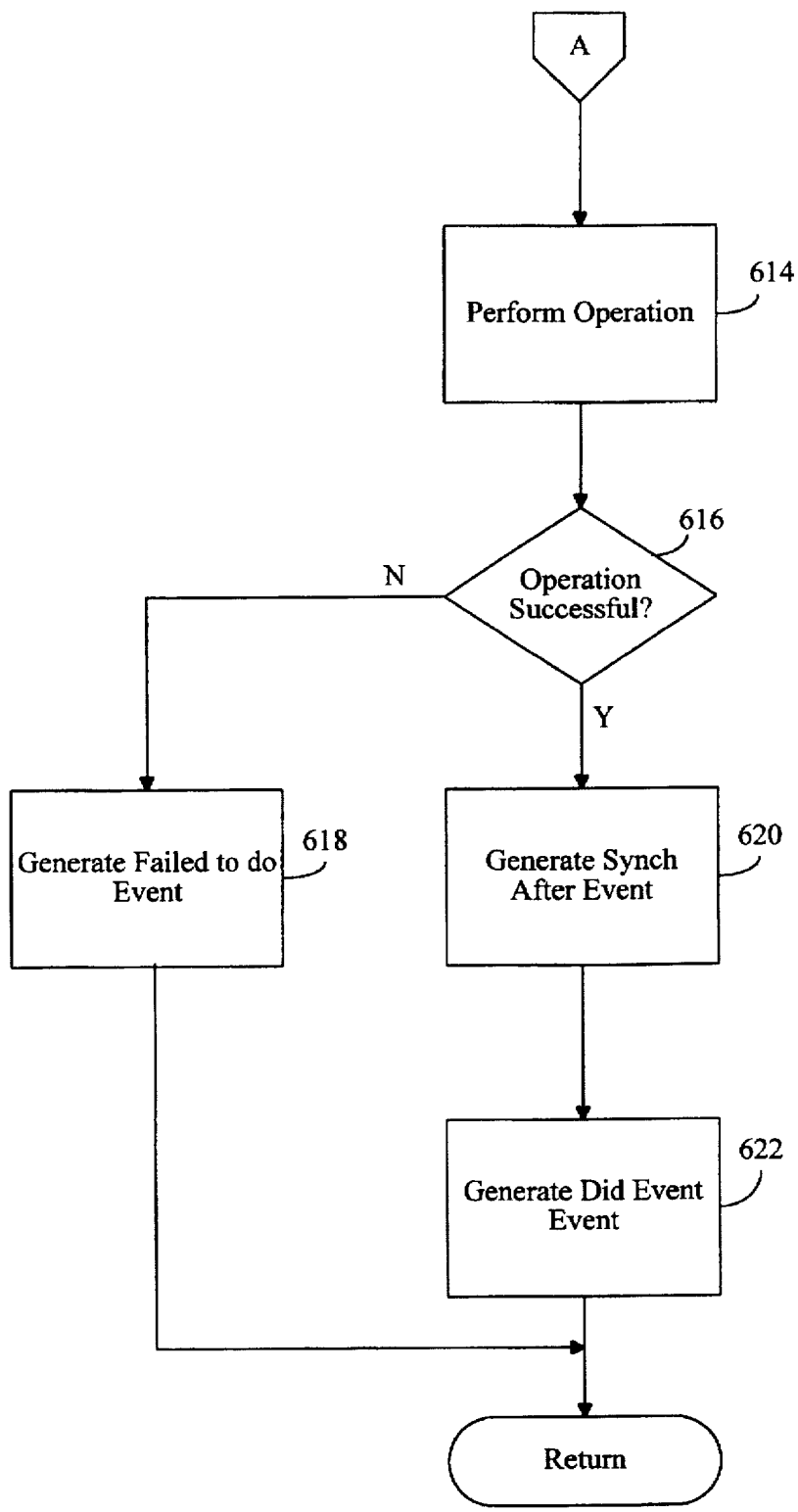

FIGS. 6A and 6B depict a flowchart of the steps performed by the cursor of the present invention for generating events. The cursor is an object that waits until receiving a request to perform an operation, generates events before performing the requested operation, performs the requested operation, and then generates events after the requested operation has been performed. By registering an interface to handle these events, consumer components can synchronize with the cursor and all other consumer components. The cursor generates events by invoking a corresponding event handler on an interface that has been registered with the cursor by a consumer component. The cursor receives a request to perform an operation when a consumer component invokes a method on the ICursor, IUpdateARow or ICursorMove interfaces. Steps 604–622 are performed when a method of the cursor is invoked. In step 604, in response to receiving the request to perform the requested operation, the cursor generates the OKToDo event for each consumer component registered with the cursor. That is, the cursor invokes all OKToDo event handlers that are registered with the cursor. In step 606, the cursor determines whether the return codes from the invoked OKToDo event handlers indicate to cancel the requested operation. If any of the return codes indicate to cancel the requested operation, in step 608, the cursor generates the cancel event and then returns to wait for a method to be invoked. The cursor generates the cancel event by invoking all of the Canceled event handlers that are registered with the cursor.

If, however, none of the return codes indicate cancel, in step 610 the cursor generates the SynchBefore event. When generating the SynchBefore event, the cursor invokes all SynchBefore event handlers that are registered with the cursor. The invocation of the SynchBefore event handlers allows the consumer components to synchronize the copy of the data that the consumer components contain with the data in the current record. That is, the consumer components can write dirty data to the current record. After each SynchBefore event handler returns, in step 612, the cursor generates the AboutToDo event by invoking all of the AboutToDo event handlers that are registered with the cursor. The invocation of the AboutToDo event handlers indicates to the consumer components that the requested operation is about to be performed.

In step 614 in FIG. 6B, the cursor performs the requested operation. Such an operation may include moving the currency, setting data within the current record, or retrieving data from the current record. In step 616, the cursor determines whether the operation performed was successful. If the operation performed was not successful, in step 618, the cursor generates the FailedToDo event by invoking all of the FailedToDo event handlers registered with the cursor and then returns to wait for a method to be invoked. If, however, the operation performed was successful, in step 620, the cursor generates the SynchAfter event by invoking all SynchAfter event handlers registered with the cursor. This allows the consumer components with the ability to synchronize the copy of the data that each consumer component contains with the data in the current record. In step 622, the cursor generates the DidEvent event by invoking all DidEvent event handlers registered with the cursor. After generating the DidEvent event, the cursor returns to wait for a method to be invoked.

Improved Communication Mechanism

Figure 7:
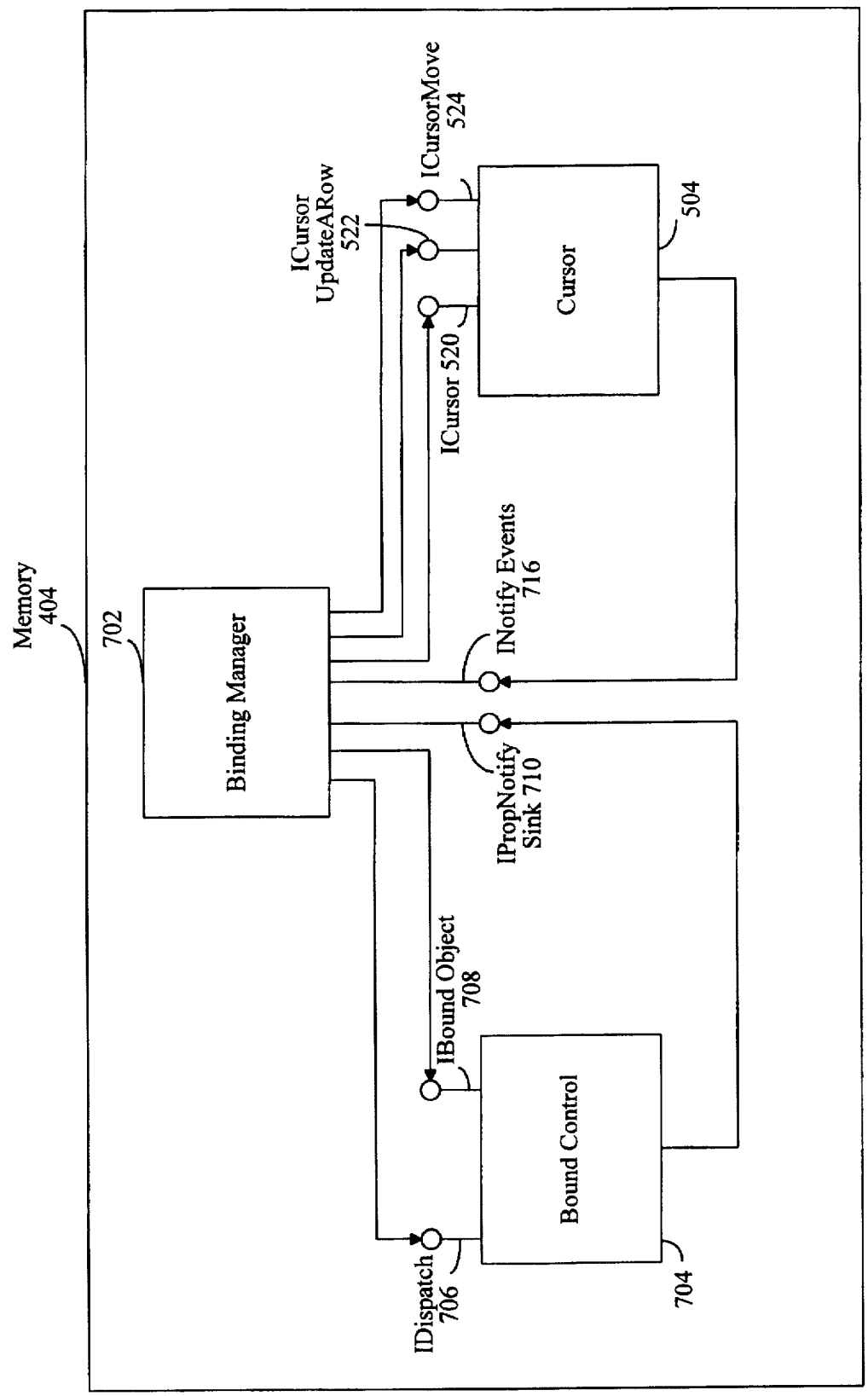
FIG. 7 depicts a more detailed diagram of the preferred embodiment of the present invention within the memory of the computer of FIG. 4.

FIG. 7 depicts a more detailed diagram of the present invention within the memory 404 of computer 400. The memory 404 contains a binding manager 702, a bound control 704 and a cursor 504. The binding manager 702 is a computer program that is responsible for managing a number of windows and the communication between the bound controls 704 and the cursors 504 for which the binding manager is responsible. In this regard, the binding manager 702 implements two interfaces: IPropNotifySink 710 and INotifyEvents 716. The binding manager 702, instead of managing a number of windows, can also be implemented as part of the implementation of the window on which the bound controls 704 reside. Hence, alternatively, the binding manager may only manage one window. The bound control 704 is an object that displays data to a user so that the user can view and modify the displayed data. The bound control 704 exposes two interfaces that are accessible by the binding manager 702: the IDispatch interface 706 and the IBoundObject interface 708. The bound control 704 has a connection point so that the binding manager can register an IPropNotifySink interface 710, which contains event handlers to be invoked upon the generation of events by the bound control. Although the binding manager 702 is depicted as managing one bound control, one skilled in the art will appreciate that the binding manager can manage many bound controls.

The cursor 504 receives requests for operations from the binding manager 702 and generates events. In order to receive requests for operations, the cursor 504 exposes three interfaces: ICursor 520, ICursorUpdateARow 522, and ICursorMove 524. The binding manager 702, therefore, requests operations to be performed on the cursor 504 by invoking the methods on the three interfaces. The cursor 504 also has a connection point that allows the binding manager 702 to register an INotifyEvents interface 716. The INotifyEvents interface 716 contains event handlers that are invoked by the cursor 504 when the cursor generates an event. In regard to FIG. 5, the binding manager 702 and the bound control 704, together, correspond to a consumer component 506, 508, 510. The binding manager 702 is responsible for transferring data between the bound control 704 and the cursor 504, as well as maintaining the logical link between the bound control and the cursor. This logical link, thus, provides for binding data. In order to maintain the logical link, the binding manager 702 maintains a link table with entries which map each property on a bound control to a cursor (or, more specifically, to a column in the result set) and also contains an indication of whether the data contained within the property of the bound control is dirty.

As previously stated, the bound control 704 is responsible for presenting data to a user. In order to perform this functionality, the bound control exposes two interfaces: IDispatch 706, and IBoundObject 708. In addition, the bound control has a connection point that allows a binding manager to register an IPropNotifySink interface. The IDispatch interface is an interface utilized by the binding manager 702 to set data within the properties of the bound control 704 and retrieve data from the properties of the bound control. The IDispatch interface is defined in U.S. patent application Ser. No. 07/975,832, entitled "Method and System for Invoking Methods of an Object," which is hereby incorporated by reference.

The IBoundObject interface contains a method that allows the binding manager to indicate to the bound control 704 that the bound control is being linked to a different cursor. The IBoundObject interface is defined in Code Table 3.

```
Code Table 3 interface IBoundObject: IUnknown
{
HRESULT OnSourceChanged (DISPID dispid, LPCURSOR pcursor,
        LPCOLUMNID pcid, LPBOOL lpfOwnBindingOut) = 0
};
```

The OnSourceChanged method is invoked by the binding manager to indicate the change of a logical link on the bound control. The parameter dispid indicates the property on the bound control for which the logical link has changed. The pcursor parameter is a reference to the ICursor interface to which the bound control is logically linked. By utilizing the pcursor parameter, the bound control can directly perform operations on the cursor. That is, the bound control can utilize the methods on the ICursor interface or utilize the QueryInterface method to retrieve the ICursorMove or ICursorUpdateARow interfaces. After receiving the ICursorMove or the ICursorUpdateARow interfaces, the bound control can then utilize the methods on those interfaces. If the pcursor parameter is null, the existing logical link is being removed instead of being changed. The pcid parameter is a reference to the field in the current record to which the property is logically linked. The lpfOwnBindingOut parameter is a return value indicating whether the bound control will perform the data transfer for the new link. If lpfOwnBindingOut is set to true, the bound control will perform all data transfer to and from the cursor. However, if lpfOwnBindingOut is set to false, all data transfers between the bound control and the cursor will be performed as normal (i.e., through the binding manager). The OnSourceChanged method will return a return code of S_OK if the bound control stored the reference to the new cursor. Otherwise, the OnSourceChanged method will return E_NOTSUPPORTED, indicating that the bound control is not interested in the reference to the new cursor.

Figure 8:
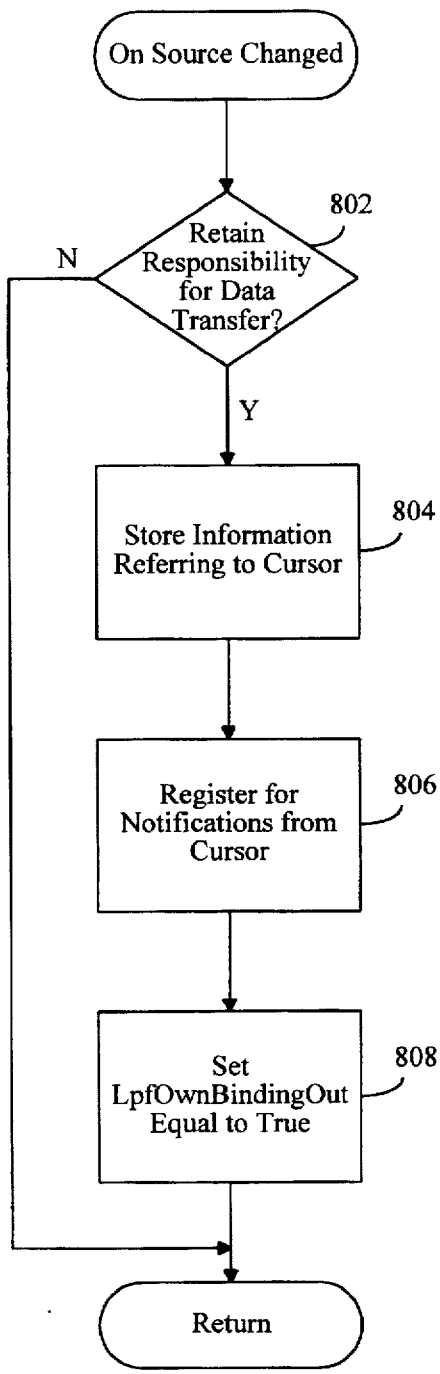
FIG. 8 depicts an example implementation of the OnSourceChanged method of the IBoundObject interface.

An example implementation of the OnSourceChanged method is provided in FIG. 8. In step 802, the bound control determines whether the bound control would like to retain responsibility for transferring data. The bound control makes this determination based upon the amount of data typically transferred. Therefore, for example, if the property on the bound control to which the cursor is logically linked displays significant amounts of information, the bound control may choose to transfer the data directly in order to reduce processing time. Transferring data directly between a bound control and a cursor is an alternative utilization of the present invention and is described in more detail below. If the bound control chooses to have all data transfers between the bound control and the cursor performed as normal, the OnSourceChanged method returns. However, if the bound control chooses to transfer the data directly, in step 804, the bound control stores information referring to the cursor. This information is contained within the pcursor parameter so that the bound control can directly invoke the methods of the ICursor, ICursorMove, and ICursorUpdateARow interfaces. In step 806, since the bound control will be communicating directly with the cursor, the bound control registers to receive notifications from the cursor. This registration is performed by registering an INotifyEvents interface with the cursor. By registering for the notifications, the bound control can be synchronized with the data in the cursor. In step 808, the bound control sets the lpfOwnBindingOut parameter equal to "true" and returns. By setting the lpfOwnBindingOut parameter, the bound control notifies the binding manager that communication between the bound control and the cursor will be handled by the bound control and that the binding manager does not need to retain information in the link table regarding this property on the bound control. Although only one method has been described on the IBoundObject interface, one skilled in the art will recognize that additional or different methods can be used.

The IPropNotifySink interface is an interface that is registered by the binding manager with a bound control. The IPropNotifySink interface contains event handlers that are invoked by the bound control when the bound control generates events. These events are distinct from the events generated by the cursor. The IPropNotifySink interface is described in Code Table 4.

```
CODE TABLE 4 class IPropNotifySink : IUnknown
{
void OnChanged (DISPID dispid);
HRESULT OnRequestEdit (DISPID dispid);
};
```

The OnChanged event handler is invoked by the bound control to indicate that a property on a bound control has changed value. The bound control invokes this event handler regardless of what entity is responsible for the change. The dispid parameter indicates the property that has changed.

The OnRequestEdit event handler is invoked by the bound control to indicate that a request has been received by the bound control to edit a property. The OnRequestEdit event handler is invoked by the bound control regardless of what entity is requesting to edit the property. The dispid parameter indicates the property upon which the edit is about to take place. The OnRequestEdit returns S_OK if the property may change value, thereby granting permission to edit the property. Otherwise, OnRequestEdit returns S_CANCEL to indicate that permission is denied to edit the property.

Associated with the class of each bound control is a "type library." Each type library maintains information on a per bound control class basis and indicates which properties on a bound control are linkable. That is, a bound control contains many properties, some of which a bound control allows to be linked and others of which the bound control does not allow to be linked. In addition, for the properties that are linkable, the type library designates which notifications the property supports: OnChanged or OnRequestEdit. The type library is defined in U.S. patent application Ser. No. 07/954,056, entitled "Method and System for Interfacing to a Type Library," which is hereby incorporated by reference.

Figure 9A:
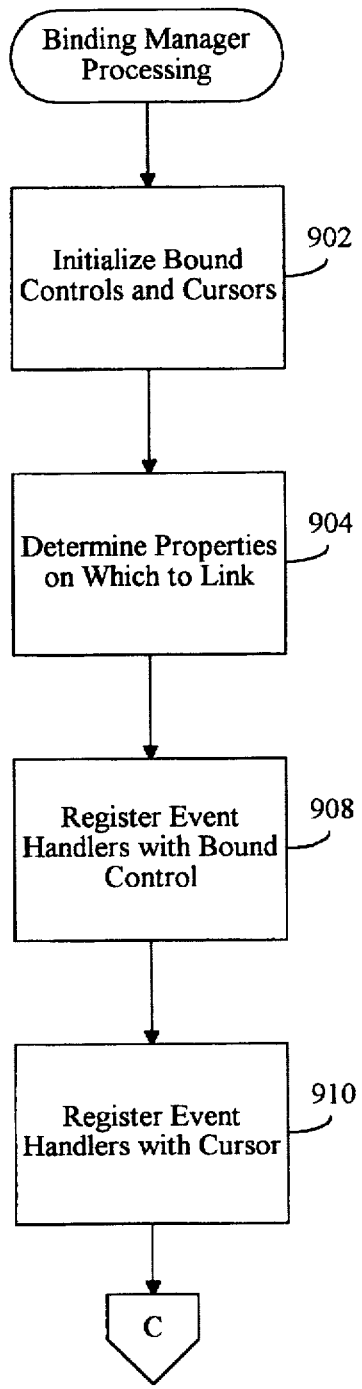
FIGS. 9A and 9B depict a flowchart of the steps performed by the binding manager of the preferred embodiment of the present invention.
Figure 9B:
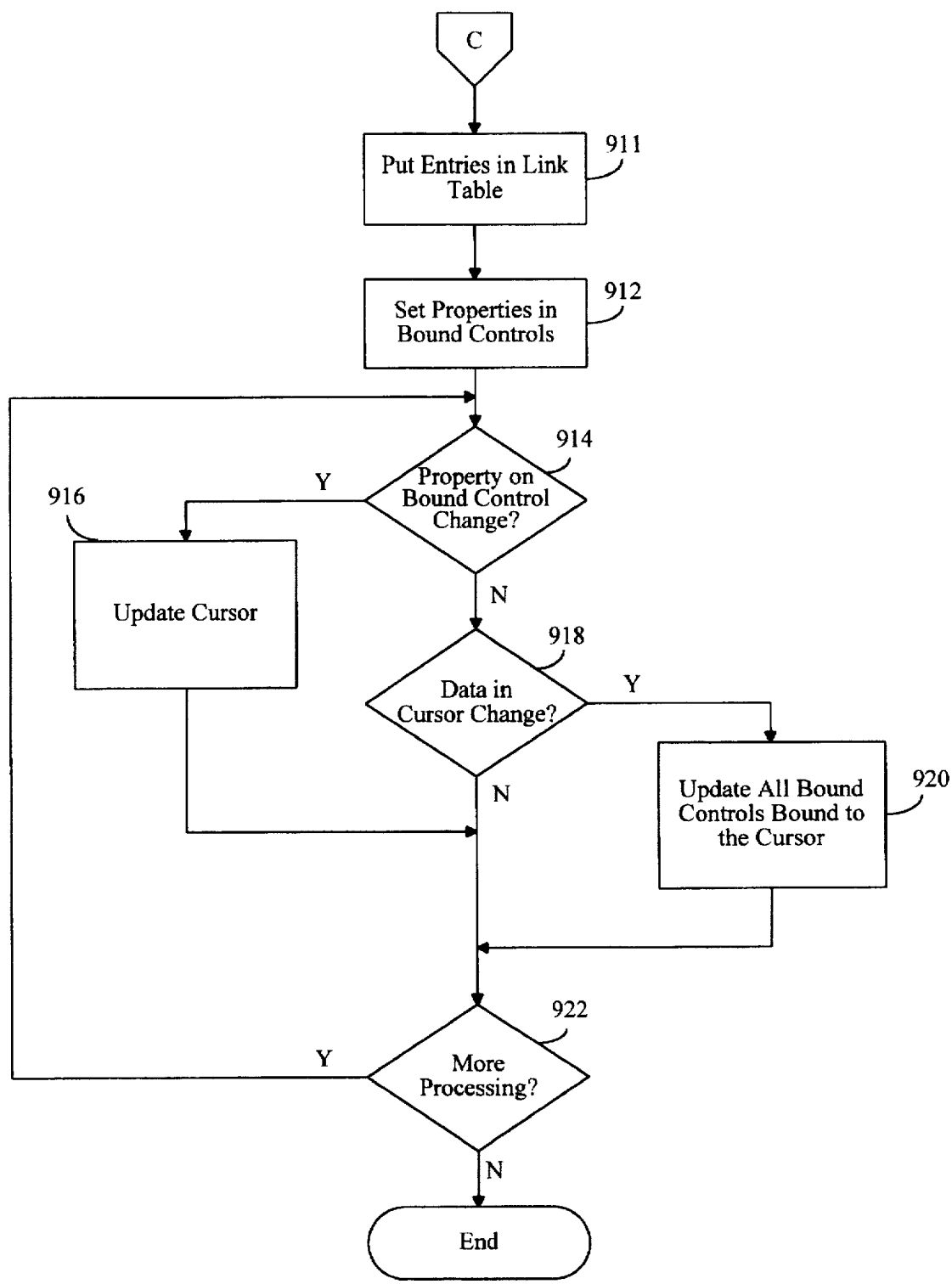
Figure 10A:
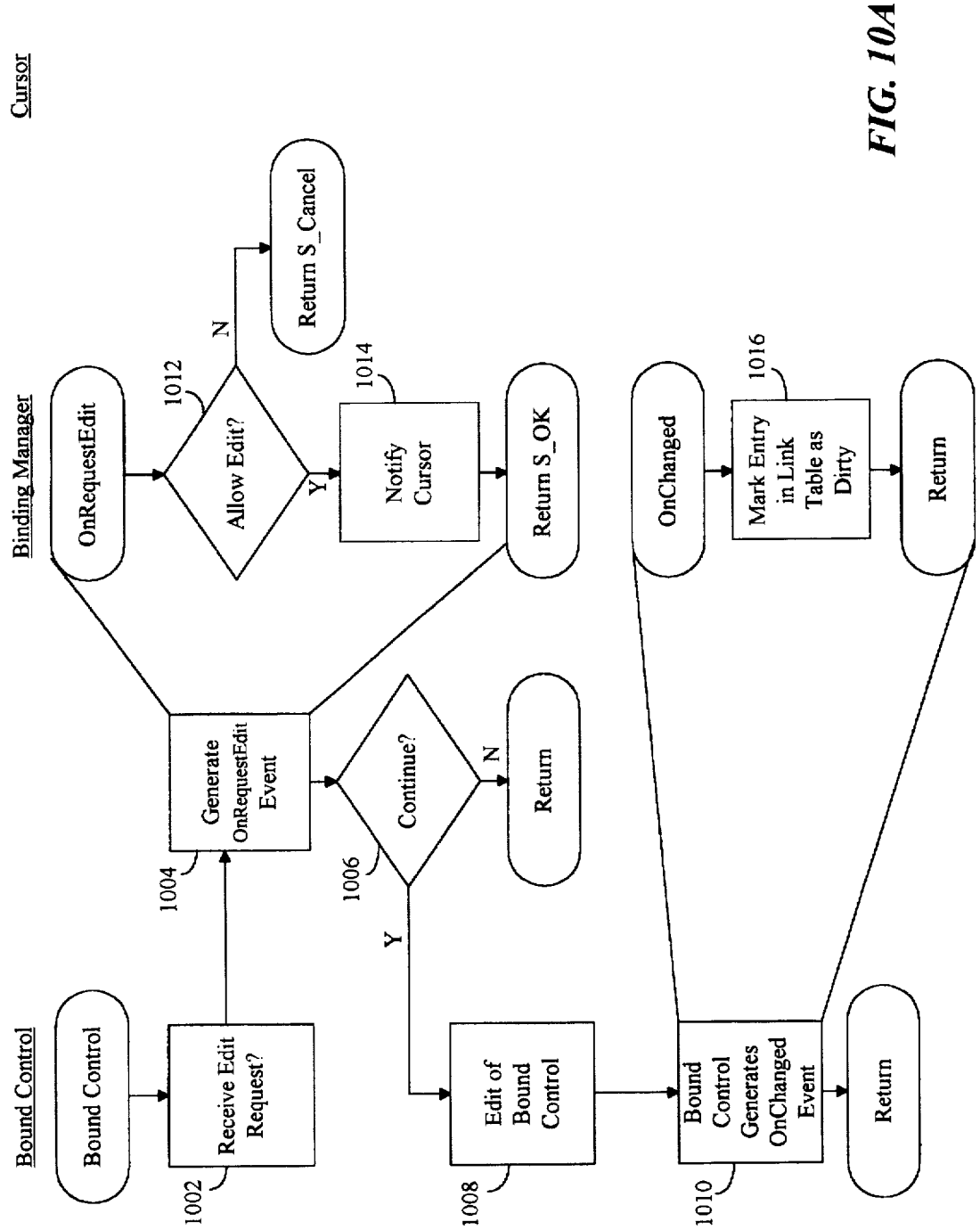
FIGS. 10A, 10B, 10C, 10D, 10E, and 10F depict a flowchart of the steps performed by the present invention when transferring data between a bound control and a cursor.
Figure 10B:
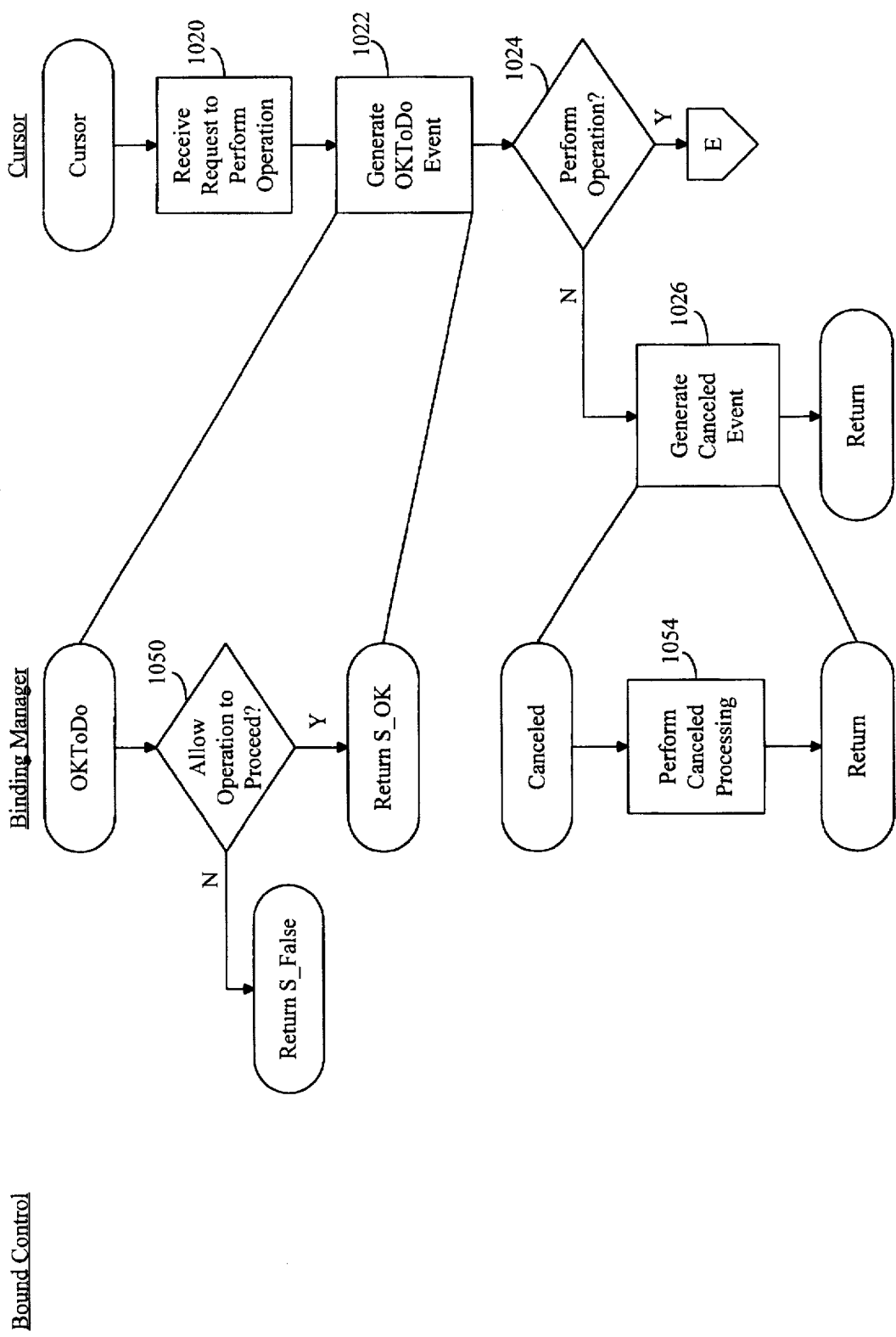
Figure 10C:
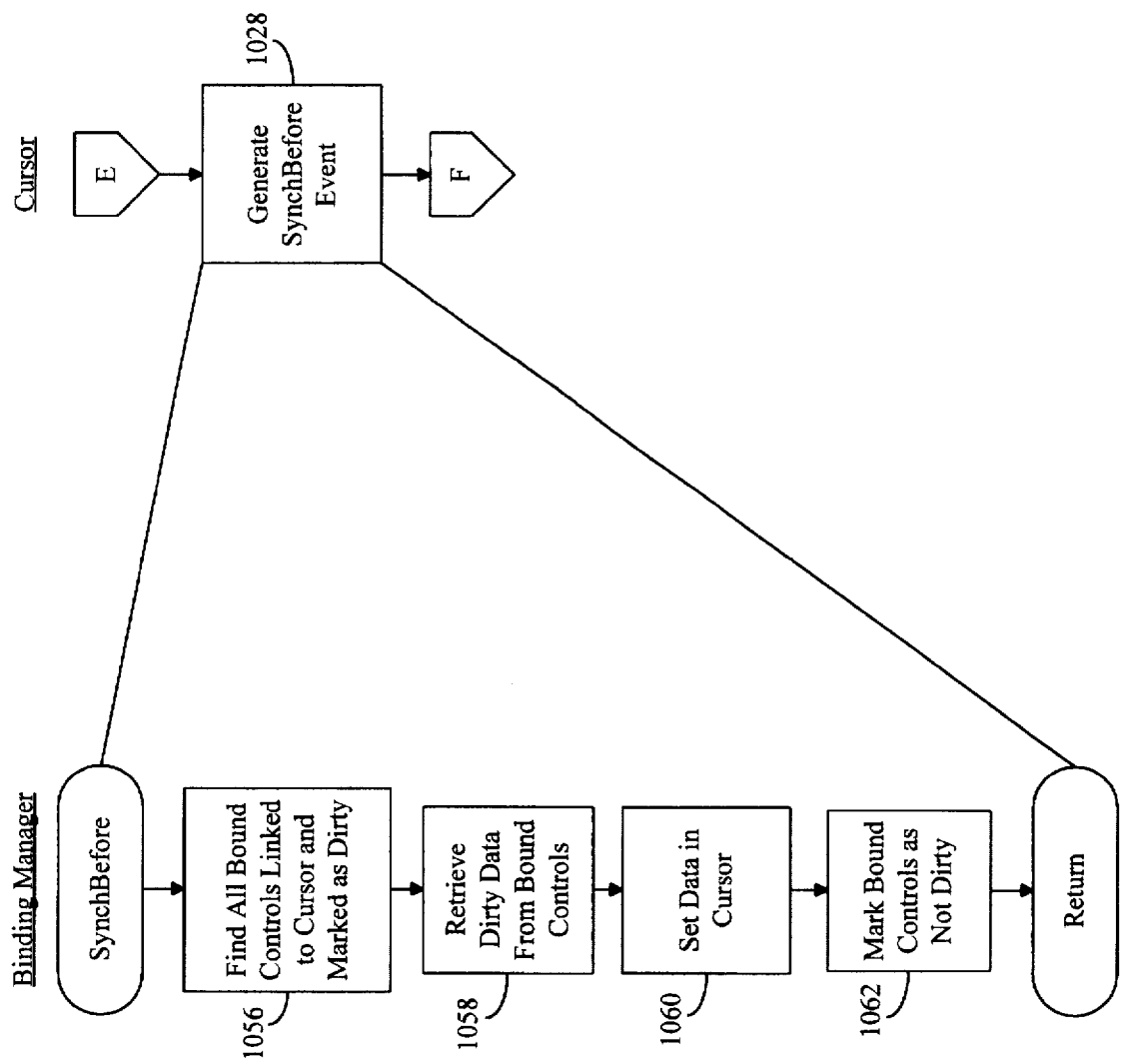
Figure 10D:
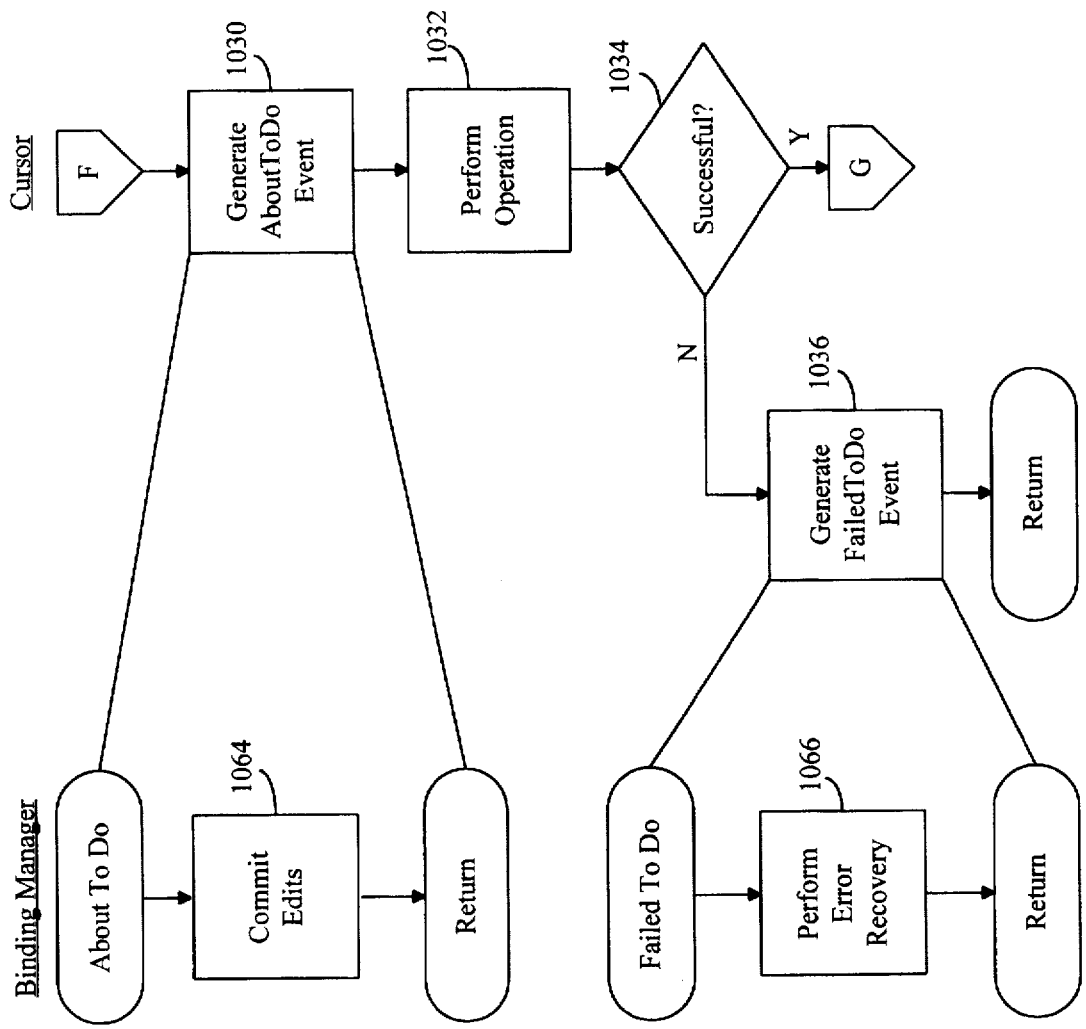
Figure 10E:
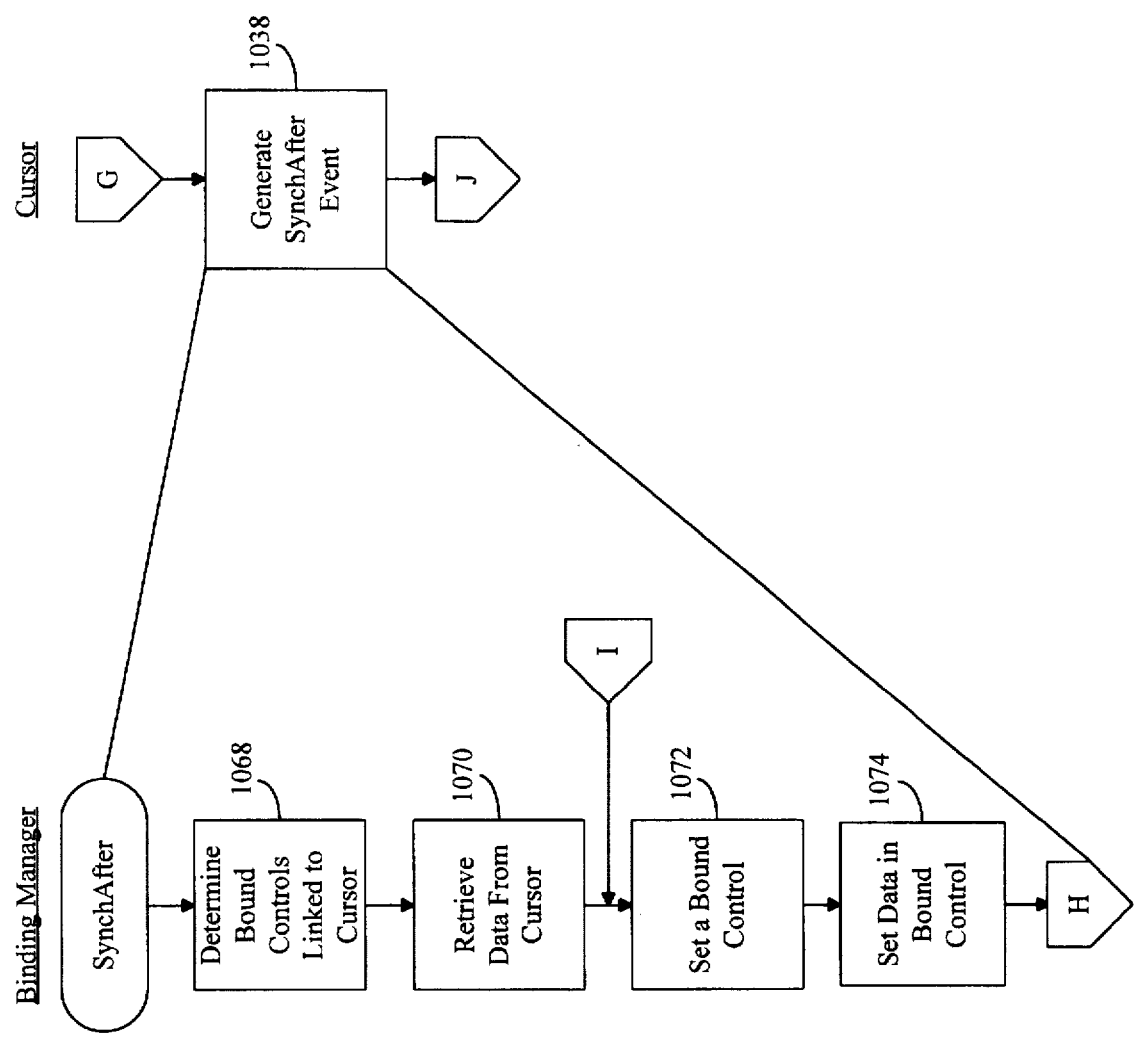
Figure 10F:
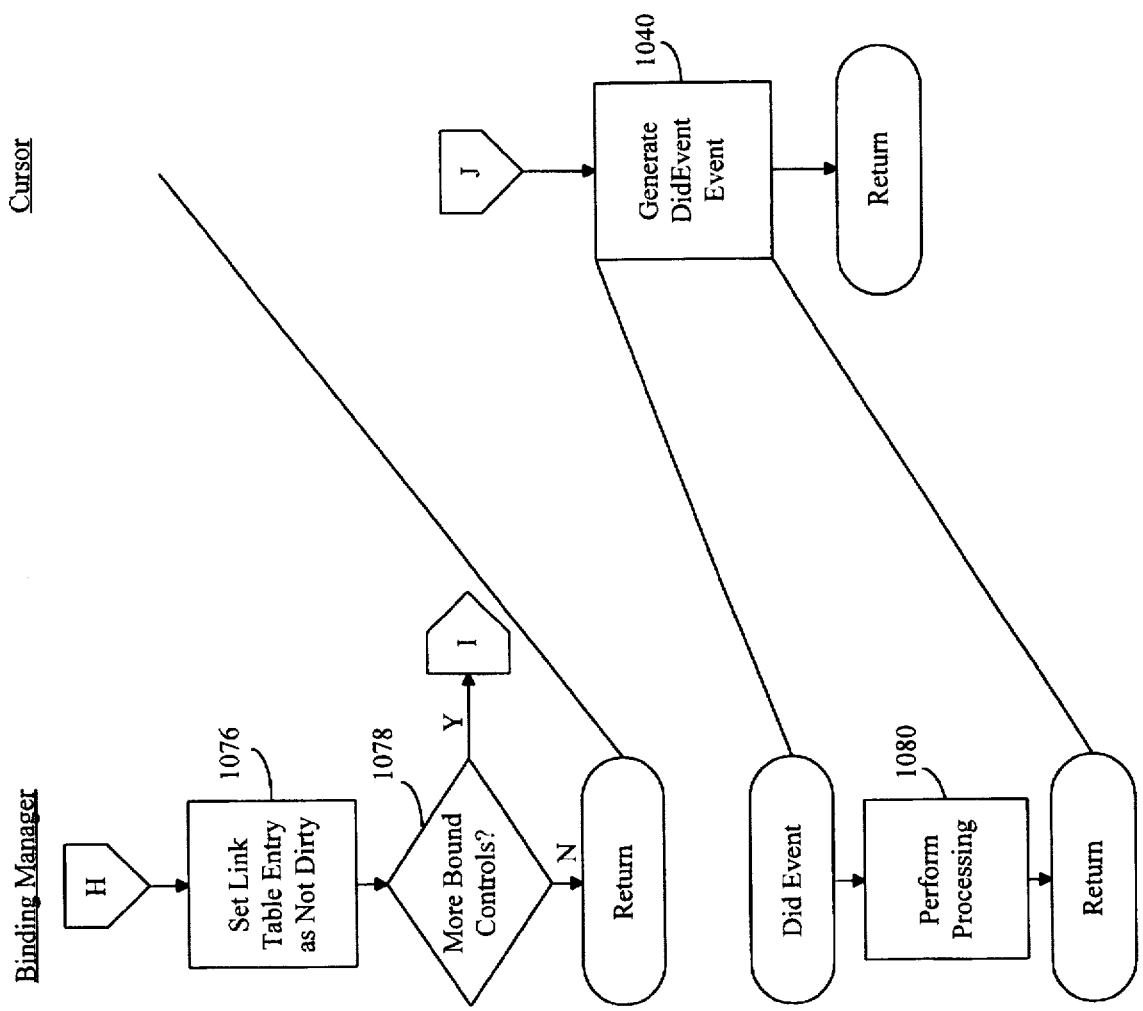

As previously stated, the binding manager is responsible for managing all bound controls on the windows for which the binding manager is responsible as well as the cursors to which the bound controls are linked. In addition, the binding manager is responsible for transferring data between all bound controls for which the binding manager is responsible and cursors. FIGS. 9A and 9B depict a flowchart of the steps performed by the binding manager of the present invention. Steps 902–912 correspond to initialization processing where the binding manager prepares for normal processing. In step 902, the binding manager initializes the bound controls and the cursors for which the binding manager is responsible. That is, the binding manager instantiates the bound controls and the cursors. In step 904, the binding manager determines the properties for all the bound controls on which to link. That is, the binding manager accesses the type library and determines which properties on each bound control are linkable. In step 908, the binding manager registers event handlers with all of the bound controls for which the binding manager would like to receive notifications. In this step, the binding manager registers an IPropNotifySink interface with each bound control for which the binding manager would like to receive notifications. In step 910, the binding manager registers event handlers with the cursor. In this step, the binding manager registers an INotifyEvents interface with each cursor utilized in the logical linking performed by the binding manager. After registering event handlers with the bound controls and the cursors, in step 911, the binding manager puts entries into the link table for each logical link between each property of a bound control and the cursor to which the property is logically linked. In step 912, the binding manager initially sets the properties in the bound controls. In this step, the binding manager invokes the GetRows method of the ICursor interface to obtain the data to be displayed in the properties of the bound controls. Then, the binding manager sets the data into the properties of each bound control utilizing the invoke method of the IDispatch interface.

After initialization has completed, the binding manager performs normal processing as depicted in steps 914–922. During the normal processing of the binding manager, the binding manager is event driven. That is, the binding manager waits until the binding manager is notified before performing processing. In step 914, the binding manager determines whether a property on a bound control has changed. In this step, the binding manager waits until receiving a notification from a bound control; that is, the invocation of an OnChanged event handler. If a property on a bound control has changed, in step 916, the binding manager transfers the dirty data to the cursor, thereby updating the current record. If the property on a bound control has not changed, in step 918, the binding manager determines whether data in the cursor has changed. That is, whether the current record has been modified or the currency has moved. If data in the cursor has changed, in step 920, the binding manager updates all of the bound controls logically linked to the cursor. The binding manager knows that data has changed in the cursor by the invocation of the SynchAfter event handler and the dwEventWhats parameter has the EVENT_DATA_IN_CURRENCY_CHANGED bit set. The binding manager updates the bound controls by accessing the link table and determining all bound controls that have an entry referring to the cursor. In step 922, the binding manager determines whether there is more processing. Unless the binding manager has been terminated, the binding manager continues to wait for a change in the data of the bound controls or the cursors.

Illustration of the Synchronization Mechanism and the Communication Mechanism FIGS. 10A, 10B, 10C, 10D, 10E, and 10F depict a flowchart of the typical steps performed when transferring data between a bound control and a cursor. Steps 1002–1010 correspond to the processing of a bound control. A bound control is event driven. That is, the bound control waits until receiving an edit request or until one of its methods is invoked. In step 1002, the bound control receives a request to edit a property of the bound control. This can occur by a user depressing a key to edit the property of the bound control; for example, the text property that displays user modifiable data to a user. In step 1004, the bound control generates the OnRequestEdit event. In generating the OnRequestEdit event, the bound control invokes the OnRequestEdit event handler. The OnRequestEdit event handler is registered by the binding manager and determines whether to allow the edit to occur.

The OnRequestEdit event handler may perform additional processing depending upon the implementation of the binding manager. For example, some binding managers follow either a pessimistic view or an optimistic view when updating the cursor. The "pessimistic view" refers to when the binding manager allocates an edit buffer immediately upon being notified that data within the bound control has changed. This ensures that the binding manager will be able to allocate an edit buffer. Using the pessimistic view, the binding manager sets the fields in the edit buffer during the processing of the OnChanged event handler and commits the edit buffer to the cursor during the processing of the AboutToDo event handler. The "optimistic view" refers to when the binding manager assumes that all updates to the cursor will work and, therefore, performs no additional processing during the processing of the OnRequestEdit event handler other than determining whether to allow the edit to occur. No additional processing needs to be performed by the OnRequestEdit event handler because, using the optimistic view, the binding manager marks the entry in the link table corresponding to a property as being dirty during the processing of the OnChanged event handler. Further, using the optimistic view, during the processing of the SynchBefore event handler, an edit buffer is allocated and the fields in the edit buffer are set and, during the processing of the AboutToDo event handler, the edit buffer is committed to the cursor.

Steps 1012–1014 correspond to the processing of the OnRequestEdit event handler. The steps described below correspond to the processing performed by a binding manager utilizing a pessimistic view. In step 1012, the OnRequestEdit event handler determines whether to allow the edit to occur. In this step, the OnRequestEdit event handler may prevent a specific property from being edited by a user. Such a property may include the title of the bound control. In addition, this step may be used by the OnRequestEdit event handler to prevent the editing of the property on the bound control over a specific period of time. Such a temporal limitation on the editing of the property may occur when the binding manager is in the process of updating the data in the database linked to the property. If the OnRequestEdit event handler does not allow the edit to occur, the OnRequestEdit event handler returns a return value of S_CANCEL. If the OnRequestEdit event handler allows the edit to occur, in step 1014, the OnRequestEdit event handler notifies the cursor that an update will occur. This allows the cursor to lock the current record in the result set. This is performed by invoking the BeginUpdate method of the ICursorUpdateARow interface. After notifying the cursor, the OnRequestEdit event handler returns a return value of S_OK.

After the OnRequestEdit event handler has completed processing, in step 1006, the return code of the OnRequestEdit event handler indicates whether the binding manager will allow the edit to occur. The bound control checks the return value and, if the return value is equivalent to S_CANCEL, the bound control ignores the edit request and returns. If the return code is equivalent to S_OK, in step 1008, the edit of the bound control occurs. An example of this step may be that the user inputs text over the displayed text, thereby modifying the displayed text. After the bound control has been edited, in step 1010, the bound control generates an OnChanged event by invoking the OnChanged event handler. The OnChanged event handler is registered by the binding manager with the bound control and is depicted in step 1016. The processing described for the OnChanged event handler corresponds to the optimistic view. In step 1016, the OnChanged event handler marks the entry in the link table corresponding to the property on the bound control generating the OnChanged event as being dirty. If, however, the OnChanged event handler were implemented using the pessimistic view, an edit buffer would already have been allocated by the OnRequestEdit event handler and the binding manager would utilize the OnChanged event handler to set the fields in the edit buffer. After taking one of the above sets of actions, the OnChanged event handler returns. After the OnChanged event handler returns, the bound control returns and continues to wait for either an edit request to be received or the invocation of one of its methods.

Steps 1020–1040 correspond to the processing of a cursor. The cursor of the present invention is event driven and, therefore, waits until receiving a request to perform an operation. The cursor receives a request to perform an operation by the invocation of a method on one of its interfaces. In step 1020, the cursor receives a request to perform an operation. Such a request may have been received from any binding manager and, specific to this diagram, was received in step 1018 by the OnChanged event handler. In step 1022, the cursor generates the OKToDo event by invoking the OKToDo event handlers. By invoking the OKToDo event handlers, the cursor provides an opportunity for each binding manager registered for notifications with the cursor to cancel the requested operation.

Step 1050 corresponds to the processing performed by the OKToDo event handler. In step 1050, the OKToDo event handler determines whether to allow the requested operation to proceed. Such a determination is based upon the implementation of the binding manager. For example, if a binding manager were in a state where it needs a significant amount of time before it will be able to update the current record, the binding manager may cancel all requested operations for moving the currency until the binding manager is able to update the current record. This may occur, for example, if the data currently being edited fails a validation procedure. If the OKToDo event handler determines to allow the requested operation to proceed, the OKToDo event handler returns S_OK. If the OKToDo event handler determines not to allow the requested operation to proceed, the OKToDo event handler returns S_FALSE. After executing the OKToDo event handler, in step 1024, the cursor checks the return value of the OKToDo event handler to determine whether to perform the requested operation. If the return value of the OKToDo event handler is equivalent to S_FALSE, in step 1026, the cursor generates the canceled event by invoking the canceled event handlers.

Step 1054 corresponds to the processing of the canceled event handler. In step 1054, the canceled event handler performs canceled processing. That is, if the binding manager prepared for the requested operation to occur, the binding manager now cancels all preparations. For example, if the binding manager had allocated memory to transfer data to the cursor in anticipation of a currency move, the binding manager would free the allocated memory. After the canceled event handler returns, the cursor returns and waits to receive a request to perform an operation. If the OKToDo event handler returns S_OK, in step 1028 in FIG. 10C, the cursor generates the SynchBefore event by invoking the SynchBefore event handlers.

Steps 1056–1062 correspond to the processing of the SynchBefore event handler of a binding manager utilizing the optimistic view. In step 1056, the SynchBefore event handler determines all bound controls that are linked to the cursor where a property on the bound control is marked as dirty. The SynchBefore event handler determines all such bound controls linked to the cursor by accessing the link table. In step 1058, the SynchBefore event handler retrieves all dirty data from the properties of the bound controls linked to the cursor. The SynchBefore event handler retrieves the dirty data by utilizing the Invoke method of the IDispatch interface and setting the wFlags parameter of the Invoke method equivalent to DISPATCH_PROPERTYGET. In step 1060, the SynchBefore event handler sets the retrieved dirty data from the properties of the bound controls into the cursor to update the current record. The SynchBefore event handler performs this step by invoking the SetColumn method of the ICursorUpdateARow interface. In step 1062, the SynchBefore event handler marks the entries in the link table corresponding to the properties of the bound controls from which the cursor retrieved the dirty data as being not dirty. If the binding manager utilized the pessimistic view, no processing needs to be performed by the SynchBefore method since an edit buffer would already have been allocated and the fields in the edit buffer would have already been set.

After returning from the processing of the SynchBefore event handler, the cursor generates the AboutToDo event by invoking the AboutToDo event handlers. Step 1064 corresponds to the processing of the AboutToDo event handler. In step 1064, the AboutToDo event handler commits edits of the edit buffer to the cursor in anticipation of the requested operation being performed. Regardless of whether the binding manager adheres to the pessimistic view or the optimistic view, the AboutToDo event handler is used to commit the edits of an edit buffer to the cursor. For example, using the optimistic view, the binding manager, as described above, implemented the SynchBefore event handler to perform all edits to the edit buffer by utilizing the SetColumn method of the ICursorUpdateARow interface and the same binding manager implemented the AboutToDo event handler to commit those edits to the result set by utilizing the Update method of the ICursorUpdateARow interface.

After the AboutToDo event handler has returned, in step 1032, the cursor performs the requested operation. In step 1034, the cursor determines whether the operation has completed successfully. If the operation has not completed successfully, in step 1036, the cursor generates the FailedToDo event by invoking the FailedToDo event handlers.

Step 1066 corresponds to the processing performed by the FailedToDo event handler. In step 1066, the FailedToDo event handler performs error recovery. Such error recovery may include storing the failed operation so that the failed operation may be requested at a later time. After the FailedToDo event handler returns, the cursor returns and waits for an operation to be requested. If the operation performed was successful, in step 1038 in FIG. 10E, the cursor generates the SynchAfter event by invoking the SynchAfter event handlers.

Steps 1068–1078 correspond to the processing performed by the SynchAfter event handler. In step 1068, the SynchAfter event handler accesses the link table to determine all properties on all bound controls linked to the cursor. In step 1070, the SynchAfter event handler retrieves the data from the cursor. The SynchAfter event handler retrieves the data by invoking the GetRows method of the ICursor interface. In step 1072, the SynchAfter event handler selects a property of a bound control that is linked to the cursor. In step 1074, the SynchAfter event handler sets the retrieved data from the cursor into the selected property of the bound control. The setting of the data into the property is performed using the Invoke method of the IDispatch interface. Upon setting the data into the property of the bound control, the bound control performs processing as depicted in steps 1002–1010. That is, the bound control generates the OnRequestEdit event and the OnChanged event. In step 1076 in FIG. 10F, the SynchAfter event handler marks the link table entry as being not dirty for the selected property. In step 1078, the SynchAfter event handler determines if there are more properties on more bound controls for processing. If there are more properties on more bound controls for processing, processing continues to step 1072 where another property on a bound control is selected for processing. However, if no more properties need processing, the SynchAfter event handler returns.

After the SynchAfter event handler returns, in step 1040, the cursor generates the DidEvent event by invoking the DidEvent event handlers. Step 1080 corresponds to the processing performed by the DidEvent event handler. In step 1080, the DidEvent event handler performs processing associated with the properties of the bound controls containing updated data. An example of such processing includes if a property of a window reflected the data in a bound control, the property of the window would be updated. For instance, if the title of a window reflected the data in a bound control, the DidEvent event handler would update the title of the window after the data in the bound control was updated. After the DidEvent event handler returns, the cursor returns to wait for an operation to be requested.

Figure 11:
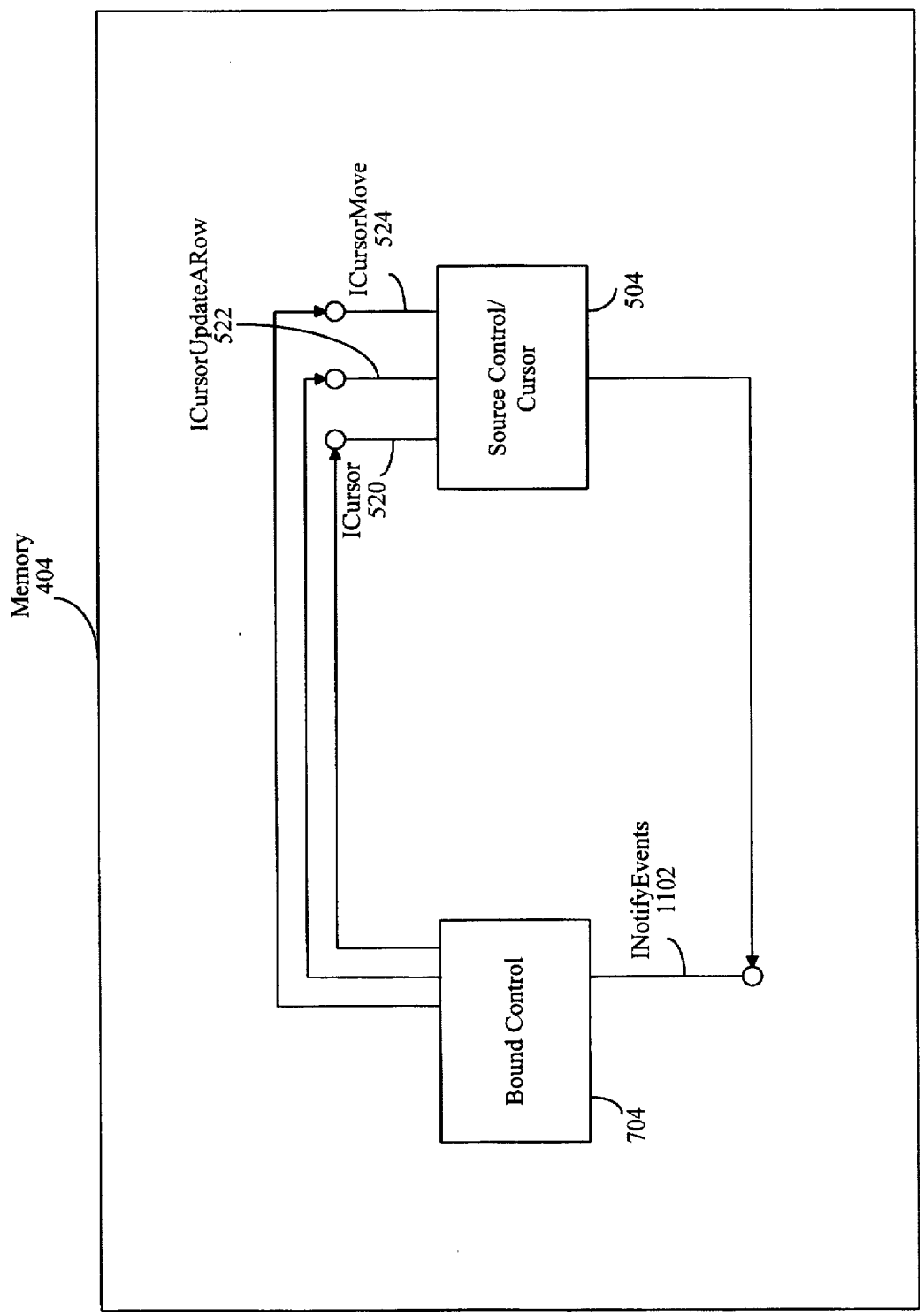
FIG. 11 depicts an alternative utilization of the present invention for transferring data between a bound control and a source control.

FIG. 11 depicts an alternative utilization of the present invention within the memory 404 of computer 400. The memory 404 contains a bound control 704 and a cursor 504. Since a reference to the ICursor interface 712 of the cursor 504 is passed into the bound control 704 each time the bound control is logically linked to a new cursor (i.e., through the pcursor parameter of IBoundObject::OnSourceChanged), the bound control can make use of this reference to directly access the cursor. The bound control 704 can also register an INotifyEvents interface 1102 with the cursor 504 so that the bound control can receive notifications directly. One advantage to directly communicating with the cursor, is if the bound control were displaying large amounts of data, the transfer of the data can go directly from the cursor to the bound control and bypass the binding manager. This allows for a faster transfer of data as opposed to going indirectly through the binding manager. In addition, although the data transfer is direct from the bound control to the cursor, synchronization is still ensured by the present invention since the bound control will receive all notifications when the cursor performs an operation. Thus, the bound control will be synchronized with all binding managers and the cursor.

While the present invention has been described with reference to a preferred embodiment thereof, those skilled in the art will know various changes in form that may be made without departing from the spirit and scope of the claimed invention as defined in the appended claims.

We claim:

1. A computer system for binding data stored in a data source to data displayed in a bound control comprising:

a data source for storing data and for sending a plurality of notifications to a binding manager, a first of the notifications being sent to the binding manager before the stored data is modified and a second of the notifications being sent to the binding manager after the stored data is modified;

a bound control for displaying the stored data to a user and for providing access for the user to modify the stored data; and a binding manager for listening for the notifications of the data source, for transferring data from the bound control to the data source in response to receiving the first notification and for transferring data from the data source to the bound control in response to receiving the second notification.

2. The computer system of claim 1 wherein the binding manager passes a reference to the data to the bound control and wherein the bound control transfers data to the data source utilizing the reference and the data source transfers data and sends notifications to the bound control utilizing the reference.

3. A computer system for synchronizing consumer components comprising:

a plurality of consumer components for presenting data to a user for display and modification; and a data source for storing data corresponding to the presented data, for maintaining an indicator to the stored data, for receiving requests to manipulate the data source and for sending a plurality of notifications to the consumer components, the requests for manipulation of the data source including modifications to the stored data and modifications to the indicator of the data source, the notifications for providing synchronization between the consumer components when presenting the stored data, the notifications further comprising:

a first of the notifications for indicating that a request has been received by the data source to manipulate the data source, wherein in response to receiving the first notification the consumer components may cancel the requested manipulation;

a second of the notifications for notifying the consumer components before the requested manipulation is performed, wherein the consumer components transfer the presented data of the consumer components to the data source when the presented data has been modified by the user; and a third of the notifications for indicating that the modified presented data of the consumer components has been transferred to the data source.

4. The computer system of claim 3 wherein the notifications further comprise:

a fourth of the notifications for indicating that the requested manipulation has been performed, wherein in response to receiving the fourth notification the consumer components transfer data indicated by the indicator of the data source to the consumer components and the consumer components present the indicated data to the user; and a fifth of the notifications for indicating that the indicated data has been transferred from the data source to the consumer components.

5. In a computer system, the computer system having a binding manager and a cursor, the cursor for storing a plurality of records of data, the binding manager for managing a bound control and the cursor, the bound control for presenting a record of data to a user, the cursor having a data reference for referring to a first of the stored records of data and for receiving requests to refer to a second of the stored records of data, the presented record being a copy of the first stored record, a method for communicating between the bound control and the cursor comprising the computer-implemented steps of:

under control of the binding manager,
retrieving the first stored record of the cursor;
sending the first stored record to the bound control to be the presented record in the bound control;
when the presented record is modified by the user,
retrieving the presented record from the bound control;
transferring the retrieved presented record to the cursor to overwrite the first stored record;
when the first stored record is modified,
retrieving the modified first stored record from the cursor;
transferring the modified first stored record from the cursor to the bound control, wherein the bound control displays the modified first stored record as the presented record in the bound control; and
when the data reference of the cursor receives a request to refer to the second stored record,
after the cursor moves the data reference to refer to the second stored record,
retrieving the second stored record from the cursor; and
transferring the second stored record from the cursor to the bound control, wherein the bound control displays the second stored record as the presented record in the bound control.

6. The method of claim 5 wherein the step of transferring the presented record includes the step of transferring the presented record from the bound control to the cursor by the bound control to overwrite the first stored record.

7. The method of claim 5 wherein the step of retrieving the modified first stored record includes the step of retrieving the modified first stored record from the cursor by the bound control.

8. The method of claim 5 wherein the step of transferring the modified first stored record includes the step of transferring the modified first stored record from the cursor to the bound control by the bound control.

9. The method of claim 5 wherein the step of retrieving the second stored record includes the step of retrieving the second stored record from the cursor by the bound control.

10. The method of claim 5 wherein the step of transferring the second stored record includes the step of transferring the second stored record from the cursor to the bound control by the bound control.

11. In a computer system, the computer system having a plurality of binding managers for transferring data to and from a cursor, the cursor for receiving requests to perform operations and for generating a plurality of notifications, a first of the notifications for requesting permission from a binding manager to perform a requested operation, a second of the notifications for transferring data from the binding manager to the cursor, a third of the notifications for storing the transferred data into the cursor, a fourth of the notifications for transferring data from the cursor to the binding managers, a fifth of the notifications for notifying the binding managers that the data has been transferred from the cursor to the binding managers, the method comprising the computer-implemented steps of:
receiving a request to perform an operation;
after receiving the request to perform the operation,
sending the first notification to the binding managers to request permission from the binding managers to perform the operation;
after sending the first notification,
receiving permission from the binding managers to perform the operation;
after receiving the permission,
sending the second notification to the binding managers to transfer data from the binding managers to the cursor;
after sending the second notification,
sending the third notification to the binding managers to store the transferred data into the cursor;
after sending the third notification,
performing the requested operation;
after performing the requested operation,
sending the fourth notification to the binding managers to transfer data from the cursor to the binding managers; and
after sending the fourth notification,
sending the fifth notification to the binding managers to notify the binding managers that the data has been transferred.

12. A data binding system comprising:
a bound control for displaying data to a user, further comprising:
a retrieve component for retrieving the displayed data from the bound control;
a generator component for generating a notification when the displayed data has changed;
a request component for requesting permission to edit the displayed data of the bound control;
a cursor for storing data; and
a binding manager for providing permission to edit the displayed data of the bound control, for receiving the notification from the bound control, for retrieving the displayed data from the bound control in response to receiving the notification and for storing the retrieved data in the cursor.

13. The data binding system of claim 12 wherein the bound control transfers the displayed data to the cursor in response to generating the notification.

14. A data binding system comprising:
a cursor for storing data, for receiving requests to perform an operation on the stored data, for performing the operation on the stored data, and for generating a notification when the operation is performed on the stored data;
a bound control for displaying the stored data of the cursor; and
a binding manager for requesting the operation to be performed on the cursor, for receiving the notification generated by the cursor, and for transferring the stored data to the bound control in response to receiving the notification.

15. The data binding system of claim 14 wherein the bound control transfers the stored data from the cursor to the bound control in response to the cursor generating the notification.

16. A data binding system comprising:
a cursor for storing data, for receiving requests to perform an operation on the stored data, for generating a first notification in response to receiving the request to perform the operation, for performing the operation and for generating a second notification after the operation has been performed;
a bound control for displaying the stored data of the cursor, for generating a third notification when a request is received to modify the displayed data, for receiving permission to modify the displayed data in response to generating the third notification, and for generating a fourth notification when the displayed data is modified; and a binding manager for receiving the third notification from the bound control, for granting permission to the bound control to modify the displayed data, for receiving the fourth notification after the displayed data is modified, for transferring the displayed data to the cursor after the displayed data has been modified, for receiving the first notification, for receiving the second notification and for transferring the stored data from the cursor to the bound control in response to receiving the second notification.

17. The data binding system of claim 16 wherein the bound control receives the second notification generated by the cursor and, in response to receiving the second notification, transfers the stored data from the cursor to the bound control.

18. The data binding system of claim 16 wherein the bound control transfers the displayed data to the cursor in response to generating the fourth notification.

19. A method in a computer system for synchronizing access to a server object by a plurality of client objects, the method comprising the computer-implemented steps of:

receiving from each client object a reference for an event handler, wherein the event handler is a function for invocation;

receiving a request to access the server object; and in response to receiving the request,
invoking the event handler of each client object to notify the client object that a request to access the server object has been received;
receiving from the invoked event handler of each client object an indication whether to proceed with the access; and
when all client objects indicate to proceed with the access, performing the requested access of the server object.

20. A method in a computer system for synchronizing access to a server by a plurality of clients, the method comprising the computer-implemented steps of:

receiving a reference to each client of the server;

receiving a request to access the server;

in response to receiving the request,
notifying each client that a request has been received to access the server by utilizing the reference of the client;
receiving from each notified client an indication whether to proceed with the requested access; and
when all clients indicated to proceed with the requested access, performing the requested access of the server.

21. The method of claim 20 wherein after performing the requested access to the server, notifying each client that the requested access has been performed.

22. The method of claim 21 wherein the step of performing the requested access to the server includes the steps of:

re-notifying each client that all clients have indicated to proceed with the requested access;

receiving from each re-notified client an indication whether to perform the requested access; and when all re-notified clients indicated to perform the requested access, accessing the server as requested.

23. A method in a computer system for synchronizing access to a server by a plurality of clients, the method comprising the computer-implemented steps of:

sending a request to access the server from a first of the clients; and each of the clients,
receiving a notification of the request to access the server;
determining whether to allow the access to occur;
when the client determines to allow the access to occur,
sending an indication that indicates the access is allowed; and
when the client determines to not allow the access to occur,
sending an indication that indicates the access is not allowed.

24. A method in a computer system for synchronizing access to a server by a plurality of clients, the method comprising the computer-implemented steps of:

each of the clients,
registering an event handler with the server;

a first of the clients,
sending a request to access the server;

under control of the server,
receiving the request;
after receiving the request,
invoking all of the registered event handlers wherein the event handlers return an indication of whether to allow the access to occur;
determining whether the indications of all of the event handlers allow the access to occur;
when all of the indications allow the access to occur, accessing the server; and
when all of the indications do not allow the access to occur,
cancelling the requested access of the server.

25. In a computer system, the computer system having a plurality of binding managers for transferring data to and from a cursor, the cursor for receiving requests to perform operations and for generating a plurality of notifications, the computer system comprising:

means for receiving a request to perform an operation by the cursor;

means for sending a first of the notifications to the binding managers to request permission from the binding managers to perform the operation after receiving the request to perform the operation;

means for receiving permission from the binding managers to perform the operation after sending the first notification;

means for sending a second of the notifications to the binding managers to transfer data from the binding managers to the cursor after receiving the permission;

means for sending a third of the notifications to the binding managers to store the transferred data into the cursor after sending the second notification;

means for performing the requested operation after sending the third notification;

means for sending a fourth of the notifications to transfer data to the binding managers after performing the requested operation; and means for sending a fifth of the notifications to notify the binding managers that the data has been transferred after sending the fourth notification.

26. A computer-readable medium on which is stored a computer program for causing communication in a computer system between a bound control that presents a record of data to a user and a cursor that stores a plurality of records of data, the computer system having a memory containing a binding manager for managing the bound control and the cursor, the cursor having a data reference for referring to a first of the stored records of data and for receiving requests to refer to a second of the stored records of data, the presented record of the bound control being a copy of the first stored record, the computer program comprising instructions which when executed by the computer system perform the steps of:

under control of the binding manager, retrieving the first stored record of the cursor;

sending the first stored record to the bound control to be the presented record in the bound control;

when the presented record is modified by the user, retrieving the presented record from the bound control;

transferring the retrieved presented record to the cursor to overwrite the first stored record;

when the first stored record is modified, retrieving the modified first stored record from the cursor;

transferring the modified first stored record from the cursor to the bound control, wherein the bound control displays the modified first stored record as the presented record in the bound control; and when the data reference of the cursor receives a request to refer to the second stored record, after the cursor moves the data reference to refer to the second stored record, retrieving the second stored record from the cursor; and transferring the second stored record from the cursor to the bound control, wherein the bound control displays the second stored record as the presented record in the bound control.

27. A computer-readable medium whose contents cause a computer system to synchronize access to a server object by a plurality of client objects by performing the steps of:

receiving from each client object a reference to an event handler;

receiving a request to access the server object; and in response to receiving the request, invoking the event handler of each client object to notify the client object that the request to access the server object has been received;

receiving from the invoked event handler of each client object an indication whether to proceed with the access; and when all of the client objects indicate to proceed with the access, performing the requested access of the server object.

28. A computer-readable medium whose contents cause a computer system to synchronize access to a server by a plurality of clients by performing the steps of:

receiving from the server a notification that the server received a request from one of the plurality of clients to access the server;

determining by all of the clients whether to allow the access to occur;

when all of the clients determine to allow the access to occur, sending to the server an indication that indicates the access is allowed; and when at least one of the clients determines to not allow the access to occur, sending to the server an indication that indicates the access is not allowed.

29. A computer-readable medium whose contents cause a computer system to synchronize access to a server by a plurality of clients by performing the steps of:

receiving a reference to each client of the server;

receiving a request to access the server;

in response to receiving the request, notifying each client that a request has been received to access the server by utilizing the reference of the client;

receiving from each notified client an indication that indicates whether to proceed with the requested access; and when all the received indications indicate to proceed with the requested access, performing the requested access of the server.

30. The computer-readable medium of claim 29 further including the step of after performing the requested access of the server, notifying each client that the requested access has been performed.

31. The computer-readable medium of claim 30 wherein the step of performing the requested access of the server includes the steps of:

re-notifying each client that all clients have indicated to proceed with the requested access;

receiving from each re-notified client an indication whether to perform the requested access; and when all re-notified clients indicate to perform the requested access, accessing the server as requested.

32. The computer-readable medium of claim 29 further including the step of when at least one of the received indications indicates not to proceed with the requested access, cancelling the requested access of the server.

* * * * *

UNITED STATES PATENT AND TRADEMARK OFFICE
CERTIFICATE OF CORRECTION

PATENT NO  : 5,706,505
DATED      : January 6, 1998
INVENTOR(S) : Christopher Lee Fraley, et al.

It is certified that error appears in the above-identified patent and that said Letters Patent is hereby corrected as shown below: On the title page, In the references cited, US Patent Documents section, add
    - - 5,396,630     3/1995   Banda, et al.     395/700 - -.

At column 11, line 59, of the patent, "remms" should read - - returns - -.

Signed and Sealed this

Twenty-second Day of June, 1999

*Attest:*

Q. TODD DICKINSON

*Attesting Officer*     *Acting Commissioner of Patents and Trademarks*